US012731775B2

(12) United States Patent
Jarrold et al.

(10) Patent No.: US 12,731,775 B2
(45) Date of Patent: Sep. 8, 2026

(54) METHOD OF OPTIMIZING GEOMETRIC AND ELECTROSTATIC PARAMETERS OF AN ELECTROSTATIC LINEAR ION TRAP (ELIT)

(71) Applicant: THE TRUSTEES OF INDIANA UNIVERSITY, Bloomington, IN (US)

(72) Inventors: Martin F. Jarrold, Bloomington, IN (US); Daniel Botamanenko, Bloomington, IN (US)

(73) Assignee: THE TRUSTEES OF INDIANA UNIVERSITY, Bloomington, IN (US)

( * ) Notice: Subject to any disclaimer, the term of this patent is extended or adjusted under 35 U.S.C. 154(b) by 386 days.

(21) Appl. No.: 18/576,405

(22) PCT Filed: Jul. 7, 2022

(86) PCT No.: PCT/US2022/073503
§ 371 (c)(1),
(2) Date: Jan. 4, 2024

(87) PCT Pub. No.: WO2023/288179
PCT Pub. Date: Jan. 19, 2023

(65) Prior Publication Data

US 2025/0006483 A1 Jan. 2, 2025

Related U.S. Application Data

(60) Provisional application No. 63/221,103, filed on Jul. 13, 2021.

(51) Int. Cl.
*H01J 49/42* (2006.01)

(52) U.S. Cl.
CPC ................................ *H01J 49/4245* (2013.01)

(58) Field of Classification Search
CPC .... H01J 49/4245; H01J 49/406; H01J 49/025; H01J 49/4265; H01J 49/061
See application file for complete search history.

(56) References Cited

U.S. PATENT DOCUMENTS

| | | | |
|---|---|---|---|
| 3,019,168 | A | 1/1962 | Taylor |
| 3,294,085 | A | 12/1966 | Wallace |

(Continued)

FOREIGN PATENT DOCUMENTS

| | | | |
|---|---|---|---|
| CA | 2484769 | A1 | 4/2005 |
| CN | 102714127 | A | 10/2012 |

(Continued)

OTHER PUBLICATIONS

Xiao, Weidong, et al., "Gene Therapy Vectors Based on Adeno-Associated Virus Type 1", Journal of Virology, vol. 73, No. 5, pp. 3994-4003 (May 1999).

(Continued)

*Primary Examiner* — David A Vanore
(74) *Attorney, Agent, or Firm* — Barnes & Thornburg LLP

(57) ABSTRACT

A method for optimizing an electrostatic linear ion trap (ELIT) for mass-to-charge (m/z) measurement resolution may include determining initial electrostatic and geometric parameters of the ELIT, modifying at least one of the initial electrostatic parameters to produce a resulting set of modified electrostatic parameters with which m/z measurements made by the ELIT are independent of a trajectory of ions moving within the ELIT relative to a longitudinal axis of the ELIT, modifying at least one of the initial geometric parameters to produce a resulting set of modified geometric parameters with which m/z measurements made by the ELIT are independent of energy of ions moving within the ELIT, (Continued)

and constructing the ELIT using the modified sets of electrostatic and geometric parameters.

11 Claims, 9 Drawing Sheets

(56) References Cited

U.S. PATENT DOCUMENTS 5,285,063 A 2/1994 Schwartz
5,478,745 A 12/1995 Samulski
5,572,025 A 11/1996 Cotter
5,770,857 A 6/1998 Fuerstenau
5,847,386 A 12/1998 Thomson
5,863,541 A 1/1999 Samulski
5,869,248 A 2/1999 Yuan
5,877,022 A 3/1999 Stinchcomb
5,880,466 A 3/1999 Benner
5,882,652 A 3/1999 Valdes
5,886,346 A 3/1999 Makarov
5,905,040 A 5/1999 Mazzara
5,916,563 A 6/1999 Young
5,965,358 A 10/1999 Carrion
6,013,487 A 1/2000 Mitchell
6,083,702 A 7/2000 Mitchell
6,156,303 A 12/2000 Russell
6,183,950 B1 2/2001 Madonna
6,583,408 B2 6/2003 Smith
6,630,662 B1 10/2003 Loboda
6,744,042 B2 6/2004 Zajfman
6,753,523 B1 6/2004 Whitehouse
6,888,130 B1 * 5/2005 Gonin ................. H01J 49/0095 250/281
7,314,912 B1 1/2008 Hallek
7,829,842 B2 11/2010 Makarov
8,294,085 B2 10/2012 Ding
8,395,112 B1 3/2013 Bier
8,409,870 B2 4/2013 Van Wuijckhuijse
8,766,170 B2 7/2014 Guna
8,866,074 B2 10/2014 Okumura
8,963,075 B2 2/2015 Chen et al.
9,095,793 B2 8/2015 Flagan
9,294,085 B1 3/2016 Gruner
9,395,112 B2 7/2016 Prins
9,409,870 B2 8/2016 Armani
9,472,390 B2 10/2016 Verenchikov
10,056,244 B1 8/2018 Quarmby
10,088,451 B2 10/2018 Giles et al.
10,964,520 B2 * 3/2021 Stewart ................. H01J 49/406
11,177,122 B2 11/2021 Jarrold
11,227,759 B2 1/2022 Jarrold
11,232,941 B2 1/2022 Jarrold
11,257,665 B2 2/2022 Jarrold
11,488,818 B2 * 11/2022 Lehmann ................ H01J 29/84
11,562,896 B2 1/2023 Jarrold
11,742,195 B2 * 8/2023 Lehmann .............. H01J 49/061 250/283
11,764,052 B2 * 9/2023 Dziekonski ......... H01J 49/4245 250/292
11,942,317 B2 3/2024 Clemmer
12,112,936 B2 10/2024 Jarrold
12,394,615 B2 * 8/2025 Jarrold ................ H01J 49/4265
2001/0013760 A1 8/2001 Uchida
2002/0014586 A1 2/2002 Clemmer
2003/0155502 A1 8/2003 Grosshans
2004/0169137 A1 9/2004 Westphall
2005/0092911 A1 5/2005 Hoyes
2005/0236375 A1 10/2005 Gefter
2007/0102634 A1 5/2007 Frey
2007/0254352 A1 11/2007 Schaffer
2009/0020694 A1 1/2009 Flory
2009/0057553 A1 3/2009 Goodenowe
2009/0078866 A1 3/2009 Li
2009/0108194 A1 4/2009 Page
2009/0294641 A1 12/2009 Konicek
2009/0294655 A1 12/2009 Ding
2010/0084549 A1 * 4/2010 Ermakov ............ H01J 49/4245 250/293
2010/0084552 A1 4/2010 Kawana
2010/0090102 A1 4/2010 Oliver
2010/0227310 A1 9/2010 Manalis
2010/0234837 A1 9/2010 Alfano
2010/0314538 A1 12/2010 Makarov
2010/0320377 A1 12/2010 Cotter
2011/0095175 A1 4/2011 Bateman
2012/0112056 A1 * 5/2012 Brucker ................ H01J 49/429 250/288
2012/0138785 A1 * 6/2012 Makarov ............... H01J 49/406 250/281
2012/0282641 A1 11/2012 Reilly
2012/0292498 A1 11/2012 Jiang
2013/0068942 A1 3/2013 Verenchikov
2013/0124099 A1 5/2013 Ecker
2013/0175440 A1 7/2013 Perelman
2013/0200261 A1 8/2013 Mizutani
2013/0234017 A1 9/2013 Kaltashov
2014/0131568 A1 5/2014 Green
2014/0197333 A1 7/2014 Jolliffe
2014/0299766 A1 10/2014 Anderson et al.
2014/0346344 A1 11/2014 Chen
2015/0008316 A1 1/2015 Guna
2015/0021472 A1 1/2015 Makarov
2015/0228445 A1 8/2015 Chang
2015/0325425 A1 11/2015 Makarov
2015/0331000 A1 11/2015 Collier
2015/0340221 A1 11/2015 Benner
2016/0005580 A1 1/2016 Grinfeld
2016/0035556 A1 2/2016 Berkout
2016/0181084 A1 6/2016 Smith
2016/0336165 A1 11/2016 Guna
2017/0040152 A1 2/2017 Makarov
2017/0307565 A1 10/2017 Clemmer
2018/0138026 A1 5/2018 Stewart
2018/0247805 A1 8/2018 Continetti et al.
2018/0350575 A1 12/2018 Hock
2019/0088459 A1 3/2019 Takahashi
2019/0236142 A1 8/2019 Balakrishnan
2019/0237288 A1 8/2019 Platzgummer
2020/0003739 A1 1/2020 Yamamoto et al.
2020/0157520 A1 * 5/2020 Singh ..................... A61K 38/50
2020/0243317 A1 7/2020 Lopez-Hilfiker
2021/0074536 A1 * 3/2021 Dziekonski ......... H01J 49/4245
2021/0183638 A1 6/2021 Nishiguchi
2021/0210332 A1 7/2021 Jarrold
2021/0210335 A1 * 7/2021 Jarrold ................ H01J 49/4245
2021/0217606 A1 * 7/2021 Jarrold .................. H01J 49/022
2021/0319994 A1 10/2021 Jarrell et al.
2022/0013348 A1 * 1/2022 Dziekonski ........... H01J 49/164
2022/0013350 A1 * 1/2022 Jarrold .................. H01J 49/022
2022/0059332 A1 2/2022 Williams
2022/0344145 A1 * 10/2022 Jarrold ................ H01J 49/4265
2023/0013173 A1 1/2023 Jarrold
2023/0039701 A1 2/2023 Jarrold
2023/0048598 A1 2/2023 Jarrold
2023/0298875 A1 9/2023 Mazdak
2024/0050895 A1 2/2024 Brown
2024/0087868 A1 3/2024 Jarrold
2024/0087875 A1 3/2024 Jarrold
2024/0412967 A1 * 12/2024 Jarrold .................. H01J 49/027
2025/0006483 A1 * 1/2025 Jarrold ................ H01J 49/4245
2025/0183023 A1 6/2025 Jarrold

FOREIGN PATENT DOCUMENTS

CN 103493173 1/2014
CN 106531608 3/2017
CN 107690690 A 2/2018
CN 108627566 10/2018
CN 110506320 A 11/2019
EP 3803953 B1 * 6/2024 .......... H01J 49/0036
EP 4391015 A2 * 6/2024 .......... H01J 49/0036
JP H01235142 A 9/1989
JP H11144675 5/1999
JP 2002-520799 7/2002

(56) References Cited

FOREIGN PATENT DOCUMENTS

| | | | | |
|---|---|---|---|---|
| JP | 2007-506106 | | 3/2007 | |
| JP | 2008186730 | A | 8/2008 | |
| JP | 2011-507194 | A | 3/2011 | |
| JP | 2014-165053 | A | 7/2014 | |
| JP | 2014-122908 | A | 9/2014 | |
| JP | 2016-522401 | A | 7/2016 | |
| JP | 2019-056598 | A | 4/2019 | |
| KR | 20170066464 | A | 6/2017 | |
| WO | 1998011244 | A1 | 3/1998 | |
| WO | 1998011244 | A3 | 3/1998 | |
| WO | 9833203 | A1 | 7/1998 | |
| WO | 1999061601 | A2 | 12/1999 | |
| WO | 2000/004568 | A1 | 1/2000 | |
| WO | 2000028004 | A1 | 5/2000 | |
| WO | 2000028061 | A1 | 5/2000 | |
| WO | 2000028061 | A9 | 5/2000 | |
| WO | 2001092551 | A2 | 12/2001 | |
| WO | 2003042704 | A1 | 5/2003 | |
| WO | 2005/081684 | A2 | 9/2005 | |
| WO | 2006130474 | A2 | 12/2006 | |
| WO | WO-2008063497 | A2 * | 5/2008 | .............. H01J 49/00 |
| WO | 2010135830 | A1 | 12/2010 | |
| WO | 2012083031 | A1 | 6/2012 | |
| WO | 2012116765 | | 9/2012 | |
| WO | 2012145037 | A1 | 10/2012 | |
| WO | 2016073850 | A1 | 5/2016 | |
| WO | 2017162779 | A1 | 9/2017 | |
| WO | 2017190031 | A1 | 11/2017 | |
| WO | 2018/109895 | A1 | 6/2018 | |
| WO | 2018217778 | A1 | 11/2018 | |
| WO | 2019118242 | A1 | 6/2019 | |
| WO | 2019162687 | A1 | 8/2019 | |
| WO | 2019231854 | A1 | 12/2019 | |
| WO | WO-2021061650 | A1 * | 4/2021 | .......... H01J 49/4245 |
| WO | 2021158676 | A1 | 8/2021 | |
| WO | 2023025400 | | 3/2023 | |
| WO | 2023111538 | A1 | 6/2023 | |
| WO | 2023111707 | A1 | 6/2023 | |
| WO | 2023139351 | A1 | 7/2023 | |
| WO | 2024023525 | A1 | 2/2024 | |

OTHER PUBLICATIONS

Xie, Qing, et al., "Canine Parvovirus Capsid Structure, Analyzed at 2.9 A Resolution", Journal of Molecular Biology, vol. 64, pp. 497-520 (1996).
Xie, Qing, et al., "The atomic structure of adeno-associated virus (AAV-2), a vector for human gene therapy", PNAS, vol. 99, No. 16, pp. 10405-10410 (Aug. 6, 2002).
Xiong, et al., The development of charge detection-quadrupole ion trap mass spectrometry driven by rectangular and triangular waves, Analyst 137, 1199-1204 (2012).
Yang, et al., Development of a palm portable mass spectrometer. J. Amer. Soc. Mass Spec. 19,1442-1448 (2008).
Yost, et al., Selected ion fragmentation with a tandem quadrupole mass spectrometer. J. Am. Chem. Soc. 100, 2274-2275(1978).
Botamanenko et al., "An electrostatic linear ion trap optimization strategy for high resolution charge detection mass spectrometry." J. Am. Soc Mass Spectrom. 2023, 34, 1731-1740. https://doi.org/10.1021/jasms.3c00177.
Examination Report No. 1 issued Apr. 29, 2025 in AU application No. 2020356396, 2 pages.
Extended European Search Report issued in App. No. EP20874490.4, dated Oct. 10, 2023.
International Search Report and Written Opinion for application No. PCT/US2025/030492, dated Jul. 16, 2025.
Japanese Office Action (Translation) for application No. 2022-547046, dated Jun. 12, 2025.
Korean Office Action for App. No. 10-2022-7024702, issued May 22, 2025.
Korean Office Action for App. No. 10-2022-7028559, issued May 27, 2025.
Todd et al., "Dynamic calibration enables high accuracy charge measurements on individual ions for charge detection mass spectrometry." J. Am. Soc. Mass Spectrom. 2020, 31, 1241-1248. . https://doi.org/10.1021/jasms.0c00081.
Extended EP Search Report completed Aug. 29, 2024 and issued in connection with EP Appln. No. 24174366., 12 pages.
English translation of an Office Action for Japanese Patent Appln. No. 2022-547047, dated Aug. 1, 2024.
PCT International Search Report and Written Opinion completed by the ISA/US on Aug. 26, 2022 and issued in connection with PCT/US2022/073503.
Hogan, J et al. "Optimized Electrostatic Linear Ion Trap for Charge Detection Mass Spectrometry" 2086-2095. American Society for Mass Spectrometry. Online. Jul. 9, 2018; Entire Document; DOI: 10.1007/s13361-018-2007-x.
English translation of a Final Office Action for Japanese Patent Appln. No. 2022-521245, dated Oct. 1, 2024, 9 pages.
English translation of an Office Action for Japanese Patent Appln. No. 2022-537360, dated Oct. 8, 2024, 3 pages.
English translation of an Office Action for Japanese Patent Appln. No. 2022-537367, dated Oct. 8, 2024, 6 pages.
European Office Action dated Dec. 9, 2024 and issued in connection with EP Appln. No. 20839500.4, 5 pages.
European Office Action dated Dec. 9, 2024 and issued in connection with EP Appln. No. 20839501.2, 5 pages.
Non-Final Office Action, mailed Sep. 29, 2024 and issued in connection with U.S. Appl. No. 17/781,483, 84 pages.
Heller, Manfred, et al. "Mass Spectrometry-Based Analytical Tools for the Molecular Protein Characterization of Human Plasma Lipoproteins", Proteomics 2005, 5, 2619-2630.
Hutchins, Patrick M., et al. "Quantification of HDL Particle Concentration by Calibrated Ion Mobility Analysis", Clinical Chemistry 60:11,1393-1401, 2014.
International Search Report and Written Opinion for copending application No. PCT/US2023/073631, dated Feb. 9, 2024.
International Search Report for copending international application PCT/US2023/073710, mailed Jan. 17, 2024.
Japanese Office Action dated Jan. 18, 2023 for application 2020-568379—11 pages (Prior art documents David Keifer, U.S. Pat. No. 5,880,466, U.S. Pat. No. 6,888,130 and U.S. Publication 2011/0240845 have been previously submitted).
Japanese Office Action dispatched Jan. 18, 2023 for 2020-568469—16 pages (prior art document JP 2010-515210 English equivalent US 2013/327934A1,cited in this document have been previously submitted).
Japanese Office Action dispatched Jan. 24, 2023 for co-pending application 2021-527871—4 pages (Prior art reference Alexander Makarov has been previously submitted).
Japanese Office Action dispatched Jan. 31, 2023 for application 2020-568364—9 pages.
Japanese Office Action dispatched Feb. 17, 2023 for application 2020-568389—11 pages.
Japanese Office Action dispatched Jan. 6, 2023 for application 2020-568366—9 pages (the Doussineau article cited in this document have been previously submitted).
Kafle et al. "Understanding gas phase modifier interactions in rapid analysis by Differential Mobility-Tandem Mass Spectrometry", J Am Soc Mass Spectrom. 2014.25(7): pp. 1098-1113, especially: p. 7, para 2; p. 10, para 5; p. 11, para 1.
Katakura et al. "A New Concept of Isotope Separation using Ion Cyclotron Resonance in a Magnetic Field Having a Radial Component", Japanese Journal of Applied Physics, Japan Society of Applied Physics, JP, vol. 32, No. 5A, Part 01 (May 1, 1993), pp. 2167-2174, XP000413943, ISSN: 0021-4922, DOI: 10.1143/JJAP.32.2167 'abstract*.
Keifer, David et al., "Charge Detection Mass Spectrometry of Bacteriophage P22 Procapsid Distributions Above 20MDa", Rapid Communications in Mass Spectrometry, vol. 28, No. 5, 2014.
Keifer, David Z., "Single-Molecule Mass Spectrometry", Mass Spectrometry Reviews, vol. 36 pp. 715-733 (2017).
Keifer, David Z., et al. "Charge Detection Mass Spectrometry with Almost Perfect Charge Accuracy", Analytical Chemistry, vol. 87, No. 20, Oct. 20, 2015, pp. 10330-10337.

(56) References Cited

OTHER PUBLICATIONS

Keifer, David Z., et al. "Charge detection mass spectrometry: weighing heavier things" The Analyst, vol. 142, No. 10, Jan. 1, 2017, pp. 1654-1671.
Kelly, Ryan T., et al. "The ion funnel: Theory, implementations, and applications", Mass Spectrometry Reviews., vol. 29, Apr. 23, 2009, pp. 294-312.
Kim et al., A multicapillary inlet jet disruption electrodynamic ion funnel interface for improved sensitivity using tmospheric pressure ion sources. Anal. Chem. 73, 4162-4170 (2001).
Kiss et al. "Size, weight and position: ion mobility spectrometry and imaging MS combined", Anal Bioanal Chem. 2011. 399: pp. 2623-2634, especially: p. 2626, col. 1, para 1.
Koizumi et al., A novel phase-coherent programmable clock for high-precision arbitrary waveform generation applied o digital ion trap mass spectrometry Int. J_ Mass Spectrom_292,23-31 (2010).
Konenkov et al., Matrix methods for the calculation of stability diagrams in quadrupole mass spectrometry. J. Amer. Soc. Mass Spec. 13, 597-613 (2002).
Korean Office Action dated May 1, 2024 for co-pending application No. 10-2021-7019302.
Kosaka, Nobuyoshi, et al., "Versatile roles of extracellular vesicles in cancer," J Clin Invest. 2016; 126(4):1163-1172. https://doi .org/10.1172/JCI81130.
Kukreja, Alexander A., et al. "Structurally Similar Woodchuck and Human Hepadnavirus Core Proteins Having Distinctly Different Temperature Dependencies of Assembly" Journal of Virology, vol. 68, No. 24, 14105-14115, Sep. 24, 2014.
Landais et al., Varying the radio frequency: A new scanning mode for quadrupole analyzers. Rapid Commun. Mass Spectrom. 12, 302-306 (1998).
Makarov, Alexander, "Electrostatic Axially Harmonic Orbital Trapping: A High-Performance Technique of Mass Analysis", Analytical Chemistry, vol. 72, No. 6, Mar. 1, 2000 (Mar. 1, 2000), p. 1156-1162.
Marmet et al., A frequency-swept quadrupole mass filter. Int. J_ Mass Spectrom. Ion Proc. 42, 3-10 (1982).
Martin F. Jarrold. "Applications of Charge Detection Mass Spectrometry in Molecular Biology and Biotechnology." Chem. Rev. 2022, 122, 7415-7441. DOI: 10.1021/acs.chemrev.1c00377.
Martin, Stability of doubly charged alkali halide clusters. J_ Chem. Phys. 76, 5467-5469 (1982).
Miller, Philip E et al. "The Quadrupole Mass Filter: Basic Operating Concepts." Journal of Chemical Education, vol. 63,7(1986): 617-622. DOI: 10.1021/ed063p617.
Miyamura, K., et al. "Parvovirus Particles as Platforms for Protein Presentation", National Academy of Sciences, vol. 1, No. 18, pp. 8507-8511 (Aug. 30, 1994).
Mori, Seiichiro, Mori, et al. "Two novel adeno-associated viruses from cynomolgus monkey: pseudotyping characterization of capsid protein", Virology 330, pp. 375-383 (2004).
Muramatsu, S., et al. "Nucleotide Sequencing and Generation of an Infectious Clone of Adeno-Associated Virus 3", Virology vol. 221; Article No. 0367; pp. 208-217 (1996).
Muzyczka, N., "Use of Adeno-Associated Virus as a General Transduction Vector for Mammalian Cells", Current Topics n Microbiology and Immunology, vol. 158, pp. 97-129 (1992).
Neustock, L.T. et al. "Inverse Design Tool for Ion Optical Devices using the Adjoint Variable Method." Sci Rep 9, 11031 (2019). https://doi.Org/10.1038/S41598-019-47408-w.
Nie et al., Frequency scan of a quadrupole mass analyzer in the third stability region for protein analysis. J. Chin. Chem_ Soc, 53, 47-52 (2006).
Office Action and Search Report for CN patent application No. 201980051696.1, dated Sep. 25, 2023. (translation appended).
Office Action and Search Report for co-pending Chinese Patent Application No. 201980079672.7, dated Nov. 1, 2023. (English translation appended).
Office Action from corresponding Korea Patent Application No. 10-2020-7037876, mailed May 16, 2024.
Office Action, issued Jan. 18, 2023 for counterpart Japan Patent Application No. 2020-568469 (English Translation).
Office Action, issued Jun. 23, 2023 for counterpart Japan Patent Application No. 2020-568469 (English Translation).
Padron, Eric, et al. "Structure of Adeno-Associated Virus Type 4", Journal of Virology, vol. 79, No. 8, pp. 5047-5058 Apr. 2005).
Paul et al., Das elekthsche massenfilter als massenspektromeler und isotopenlrenner. Z. Phys. 152,143-182 (1958).
Paul, et al., Das elektrische massenfiller, Z. Phys. 140,262-273 (1955).
PCT International Search Report and Written Opinion completed by the ISA/EP on Sep. 9, 2019 and issued in connection with PCT/US2019/013279.
PCT International Search Report and Written Opinion completed by the ISA/EP on Feb. 14, 2019 and issued in connection with PCT/US2018/051944.
PCT International Search Report and Written Opinion completed by the ISA/EP on Jul. 14, 2020 and issued in connection with PCT/US2020/029287.
PCT International Search Report and Written Opinion completed by the ISA/EP on Apr. 16, 2019 and issued in connection with PCT/US2019/013274.
PCT International Search Report and Written Opinion completed by the ISA/EP on Apr. 18, 2019 and issued in connection with PCT/US2019/013251.
PCT International Search Report and Written Opinion completed by the ISA/EP on Jul. 24, 2019 and issued in connection with PCT/US2019/013278.
PCT International Search Report and Written Opinion completed by the ISA/EP on Jul. 26, 2019 and issued in connection with PCT/US2019/013285.
PCT International Search Report and Written Opinion completed by the ISA/EP on Aug. 27, 2019 and issued in connection with PCT/US2019/013281.
PCT International Search Report and Written Opinion completed by the ISA/EP on Aug. 27, 2019 and issued in connection with PCT7US2019/035381.
PCT International Search Report and Written Opinion completed by the ISA/EP on Mar. 27, 2019 and issued in connection with PCT/US2019/013277.
PCT International Search Report and Written Opinion completed by the ISA/EP on Mar. 27, 2019 and issued in connection with PCT7US2019/013283.
PCT International Search Report and Written Opinion completed by the ISA/EP on Mar. 28, 2019 and issued in connection with PCT/US2019/013280.
PCT International Search Report and Written Opinion completed by the ISA/EP on Mar. 29, 2019 and issued in connection with PCT/US2019/013284.
PCT International Search Report and Written Opinion completed by the ISA/EP on Mar. 8, 2021 and issued in connection with PCT/US2020/065300.
PCT International Search Report and Written Opinion completed by the ISA/EP on Mar. 8, 2021 and issued in connection with PCT/US2020/065301.
PCT International Search Report and Written Opinion completed by the ISA/EP on Sep. 9, 2019 and issued in connection with PCT/US2019/035379.
PCT International Search Report and Written Opinion completed by the ISA/US on Apr. 5, 2021 and issued in connection with PCT/US2021/016325.
PCT International Search Report and Written Opinion completed by the ISA/US on Apr. 5, 2021 and issued in connection with PCT/US2021/016435.
PCT International Search Report and Written Opinion completed by the ISA/US on Mar. 8, 2021 and issued in connection with PCT/US2020/65300.
PCT International Search Report and Written Opinion completed by the ISA/US on Oct. 11, 2021 and issued in Connection with PCT/US2021/034480.
PCT International Search Report and Written Opinion completed by the ISA/US on Jan. 12, 2016 and issued in connection with PCT/US2015/059463.

(56) References Cited

OTHER PUBLICATIONS

PCT International Search Report and Written Opinion completed by the ISA/US on Mar. 18, 2021 and issued in connection with PCT/US2021/016325.
PCT International Search Report and Written Opinion completed by the ISA/US on Jun. 19, 2017 and issued in connection with PCT/US2017/030163.
PCT International Search Report and Written Opinion completed by the ISA/US on Nov. 23, 2020 and issued in Connection with PCT/US2020/052009.
PCT International Search Report and Written Opinion completed by the ISA/US on Jan. 24, 2021 and issued in connection with PCT/US2020/054975.
Pierson, Elizabeth E., et al. "Charge Detection Mass Spectrometry Identifies Preferred Non-icosahedral Polymorphs in the Self-Assembly of Woodchuck Hepatitis Virus Capsids", Jour. of Molecular Biology, vol. 428, Issue 2, pp. 292-300. Jan. 29, 2016.
Pierson, Elizabeth E., et al., "Detection of Late Intermediates in Virus Capsid Assembly by Charge Detection Mass Spectrometry", Journal of the American Chemical Society, vol. 136, No. 9, Feb. 19, 2014, 3536-3541.
Pierson, Elizabeth E., et al., Charge Detection Mass Spectrometry for Single Ions with an Uncertainty in the Charge Measurement of 0.65 e; Elizabeth E_ Pierson et al.; Journal American Society for Mass Spectrometry, vol. 26, pp. 1213-1220 (2015).
Pierson, Elizabeth, "Charge Detection Mass Spectrometry: Instrumentation & Applications to Viruses", Proquest Dissertations and Theses; Thesis (Ph.D.) vol. 76-09(E), Section: B. 168, May 2015.
Pin Li et al., "Progress in Exosome Isolation Techniques", Theranostics, vol. 7, No. 3, (Jan. 1, 2017), pp. 789-804, XP055417509, AU, ISSN" 1838-7640, DOI: 10.7150/thno.18133.
Puttaraju, M., et al. "Spliceosome-mediated RNA trans-splicing as a tool for gene therapy", Nature Biotechnology, vol. 17, pp. 246-252 (Mar. 1999).
Richards et al., A new operating mode for the quadrupole mass filler. Int. J. Mass Spectrom. Ion Phys. 12, 317-339 (1973).
Richards et al., Waveform parameter tolerances for the quadrupole mass filler with rectangular excitation. Int. J. Mass Spectrom. Ion Phys_ 15, 417-428 (1974).
Satoh, "Development of JMS-S3000: MALDI-TOF/TOF Utilizing a Spiral Ion Trajectory," JEOL News, vol. 45, No. 1, 34-37 (2010).
Schlunegger et al., Frequency scan for the analysis of high mass ions generated by matrix-assisted laser esorption/ionization in a Paul trap_ Rapid Commun. Mass Spectrom. 13, 1792-1796 (1999).
Seiji Ogata et al. "Real-time Optimization Method for Optical Parameters of Ion Implanters." AIP Conf. Proa, vol. 866, 1 (2006): 433-136. https://doi.org/10.1063/1.2401549.
Shade, Rosemary, et al. "Nucleotide Sequence and Genome Organization of Human Parvovirus B19 Isolated from the Serum of a Child during plastic Crisis", Journal of Virology, vol. 58, No. 3, pp. 921-936 (Jun. 1986).
Sharp, Phillip A., et al. "RNA Interference", American Association for the Advancement of Science; Science, New Series, vol. 287, No. 5462, pp. 2431-2433 (Mar. 31, 2000).
Shi, Z., et al. "Insertional Mutagenesis at Positions 520 and 584 of Adena-Associated Virus Type 2 (MV2) Capsid Gene and Generation of MV2 Vectors with Eliminated Heparin-Binding Ability and Introduced Novel Tropism", Human Gene Therapy, vol. 17, pp. 353-361 (Mar. 2006).
Shinholt, Deven L, et al., "A Frequency and Amplitude Scanned Quadrupole Mass Filter for the Analysis of High m/z Ions", Review of Scientific Instruments 85, 113109 (2014) (Received Sep. 11, 2014; accepted Oct. 17, 2014; published online Nov. 21, 2014).
Snijder, J., et al., "Defining the Stoichiometry and Cargo Load of Viral and Bacterial Nanoparticles by Orbitrap Mass Spectrometry", J. Am. Chem. Soc. 2014, 136, 7295-7299.
Sobott et al., A tandem mass spectrometer for improved transmission and analysis of large macromolecular Assemblies. Anal. Chem. 74, 1402-1407 (2002).
Sonalikar, Hrishikesh S., et al. "Numerical analysis of segmented-electrode Orbitraps", International Journal of Mass Spectrometry, Elsevier Science Publishers, Amsterdam, NL, vol. 395, Dec. 17, 2015 (Dec. 17, 2015), p. 36-48.
Srivastava, Arun, et al., "Nucleotide Sequence and Organization of the Adena-Associated Virus 2 Genome", Journal of Virology, vol. 45, No. 2, pp. 555-564 (Feb. 1983).
Supplemental European Search Report for counterpart European Patent Application No. 20874490.4 dated Oct. 10, 2023 (9 pages).
Supplemental European Search Report for European Patent Application No. 17790559.3 dated Nov. 12, 2019 (11 pages).
Syed, et al., Quadrupole mass filter: Design and performance for operation in stability zone 3. J. Am. Soc. Mass Spectrom. 24, 1493-1500 (2013).
Todd, Aaron R., et al. "Implementation of a Charge-Sensitive Amplifier without a Feedback Resistor for Charge Detection Mass Spectrometry Reduces Noise and Enables Detection of Individual Ions Carrying a Single Charge", J. Am. Soc. Mass Spectrom. 2020, 31, 146-154.
Tsao, Jun, et al., "The Three-Dimensional Structure of Canine Parvovirus and Its Functional Implications", American Association for the Advancement of Science, Science, New Series, vol. 251, No. 5000, pp. 1456-1464 (Mar. 22, 1991).
Uetrecht et al., "High-resolution mass spectrometry of viral assemblies: Molecular composition and stability of dimorphic hepatitis B virus capsids", PNAS 2008, vol. 105, 9216-9920.
Uetrecht et al., "Stability and Shape of Hepatitis B Virus Capsids In Vacuo", Angew. Chem. Int. Ed. 2008,47, 6247-6251.
Walters, Robert W., "Structure of Adeno-Associated Virus Serotype 5", Journal of Virology, vol. 78, No. 7, pp. 3361-3371 (Apr. 2004).
Wang, Lei, et al., "Expanding the Genetic Code", Annual Review of Biophysics and Biomolecular Structure, vol. 35, pp. 25-249 (2006).
Weiss, Victor U., et al., "Analysis of a Common Cold Virus and Its Subviral Particles by Gas-Phase Electrophoretic Mobility Molecular Analysis and Native Mass Spectrometry", Anal Chem. 2015.
Winger, Brian E., et al., "Observation and Implications of High Mass-to-Charge Ratio Ions from Electrospray Ionization Mass Spectrometry," 1993 American Society for Mass Spectrometry 4, 536-545.
Wright, J. Fraser, "Product-Related Impurities in Clinical-Grade Recombinant AAVVectors: Characterization and Risk Assessment", Biomedicines 2014, 2, 80-97.
Chinese Office Action (including English Translation) issued in App. No. CN202080085308.4, dated Feb. 14, 2025.
Chinese Office Action (including English translation) issued in App. No. CN202080096842.5, dated Dec. 12, 2024, 19 pages.
Chinese Office Action (including English translation) issued in App. No. CN202080096856.7, issued on Feb. 17, 2025.
Extended European Search Report issued in App. No. EP22842998, dated Apr. 25, 2025, 15 pages.
International Search Report and Written Opinion issued in App. No. PCT/US2024/057410 mailed Jan. 21, 2025, 16 pages.
Japanese Office Action (including English translation) issued in App. No. JP2022518995, dated Dec. 3, 2024, 6 pages.
Japanese Office Action (including English translation) issued in App. No. JP2022537360, dated Oct. 8, 2024, 6 pages.
Korean Office Action issued in App. No. KR10-2022-7013722, dated Mar. 10, 2025. Machine translation appended.
Korean Office Action issued in App. No. KR10-2022-7014884, dated Feb. 3, 2025. Translation appended.
Wies K et al: "Development Towards a Laser Ion Source Trap for the Production of Exotic Species", Hyperfine Interactions, Kluwer Academic Publishers, DO, vol. 162, No. 1-4, Apr. 1, 2005 (Apr. 1, 2005), pp. 29-38, XP019246273,ISSN: 1572-9540.
Wu G et al: "Ion Trajectory Simulation for Electrode Configurations with Arbitrary Geometries", Journal of the American Society for Mass Spectrometry, Elsevier Science Inc, US, vol. 17, No. 9, Sep. 1, 2006 (Sep. 1, 2006), pp. 1216-1228, XP027973707, ISSN: 1044-0305 [retrieved on Sep. 1, 2006].
Andrew G. Elliott et al, "Effects of Individual Ion Energies on Charge Measurements in Fourier Transform Charge Detection Mass Spectrometry (FT-CDMS)", Journal of the American Society for

(56) References Cited

OTHER PUBLICATIONS

Mass Spectrometry., US, (Nov. 14, 2018), doi:10.1007/s13361-018-2094-8, ISSN 1044-0305, XP055582125.
Anthony, et al., A simple electrospray interface based on a DC ion carpet, Int. J. Mass Spectrom. 371, 1-7 (2014).
Anthony, Staci N. "MS /MS instrumentation for megadalton-sized ions", 2016, XP055619426, ISBN: 978-1-369-02558-3 Retrieved from the Internet: URL:https://search.proquest.com/docview/1830450391?accountid=29404.
Bantel-Schaal, U., et al., "Human Adena-Associated Virus Type 5 is Only Distantly Related to Other Known Primate Helper-Dependent Parvoviruses", Journal of Virology, vol. 73, pp. 939-947 (Feb. 1999).
Barnes L F et al. "Analysis of thermally driven structural changes, genome release, disassembly, and aggregation of recombinant AAV by CDMS." Molecular Therapy—Methods & Clinical Development, vol. 27, Dec. 1, 2022 (Dec. 1, 2022), pp. 327-356, XP093127574, GB, ISSN: 2329-0501, DOI: 10.1016/j.omtm.2022.10.008.
Barnes, Lauren F et al. "Analysis of Recombinant Adenovirus Vectors by Ion Trap Charge Detection Mass Spectrometry: Accurate Molecular Weight Measurements beyond 150 MDa." Analytical chemistry vol. 94,3 (2022): 1543-1551. doi: 10.1021/acs.analchem.1 c02439.
Bernaud J et al. "Characterization of AAV vector particle stability at the single-capsid level." J. Biol. Phys., vol. 44, 2018, pp. 181-194, XP036492006.
Beuhler, et al., A study of the formation of high molecular weight water cluster ions (m/e < 59000) in expansion of ionized gas mixtures, J. Chem. Phys. 77,2549-2557 (1982).
Beuhler, et al., Threshold studies of secondary electron emission induced by macro-ion impact on solid surfaces. Nucl. Instrum. Methods. 170, 309-315 (1980).
Bioconjugate Techniques; Hermanson; . Academic Press, 1st Edition (1996),. (book reference, chapter guide attached book/specific chapter(s) to be made available upon request).
Bot, Marek-Verfasser. "Gas-Phase Study of Dispersion-Bound Complexes." Gas-Phase Study of Dispersion-Bound Complexes, ETH Zurich, 2019. https://doi.org/10.3929/ethz-b-000424112.
Botamanenko, Daniel, et al., "Ion-Ion Interactions in Charge Detection Mass Spectrometry", J Am Soc Mass Spectrom. Dec. 2019; 30(12): 2741-2749. doi: 10.1007/s13361-019-02343-y.
Brancia, et al., Digital asymmetric waveform isolation (DAWI) in a digital linear ion trap. J Am. Soc Mass Spectrom. 1. 1530-1533 (2010).
Brown, Brooke Ann, et al, Charge Detection Mass Spectrometry Measurements of Exosomes and other Extracellular Particles Enriched from Bovine Milk, Analytical Chemistry, Jan. 28, 2020.
Brown, C, et al. "Chimeric Parvovirus B19 Capsids for the Presentation of Foreign Epitopes",; Virology 198, pp. 477-488 (1994).
Burnham, et al. "Analytical Ultracentrifugation as an Approach to Characterize Recombinant Adeno-Associated Viral vectors", Human Gene Therapy Methods, vol. 26, No. 6; pp. 228-242, Oct. 15, 2015.
Chao, Hengjun, et al. "Several Log Increase in Therapeutic Transgene Delivery by Distinct Adeno-Associated Viral Serotype Vectors" Molecular Therapy vol. 2, No. 6, pp. 619-623 (Dec. 2000).
Chemushevich, et al., Collisional cooling of large ions in electrospray mass spectrometry. Anal. Chem 76. H54-1760 (2004).
Chiorini, John A., "Cloning and Characterization of Adeno-Associated Virus Type 5", Journal of Virology, vol. 73, DP-1309-1319 (Feb. 1999).
Chiorini, John A., et al. "Cloning of Adeno-Associated Virus Type 4 (AAV4) and Generation of Recombinant AAV4 Particles", Journal of Virology, vol. 71, pp. 6823-6833 (Sep. 1997).
Cleves, Ann E., "Protein transport: The nonclassical ins and outs", Current Biology, vol. 7, No. 5, pp. 318-320 (1997).
Contino, Nathan Colby "Ion trap charge detection mass spectrometry: Lowering limits of detection and improving signal to noise", ISBN:9781303535048, Jul. 30, 2013 (Jul. 30, 2013), Retrieved from the Internet: URL:https://search.proquest.com/docview/1468444320?accountid=29404.
Ding, et al, A digital ion trap mass spectrometer coupled with atmospheric pressure ion sources. J Mass Spectrom. 69, 471-484 (2004).
Ding, et al., A simulation study of the digital ion trap mass spectrometer. Int. J. Mass Spectrom. 221, 117-138 (2002).
Douglas D.J. Linear quadrupoles in mass spectrometry. Mass Spectrom. Rev. 28, 937-960 (2009).
Doussineau, Tristan, et al. "Infrared multiphoton dissociation tandem charge detection-mass spectrometry of single megadalton electrosprayed ions", Review of Scientific Instruments, AIP, Melville, NY, US, vol. 82, No. 8, Aug. 1, 2011, pp. 84104-84104.
Draper, Benjamin E., "The FUNPET a New Hybrid Ion Funnel-Ion Carpet Atmospheric Pressure Interface for the Simultaneous Transmission of a Broad Mass Range", Journal of the American Society of Mass Spectrometry 29, 2160-2172, Aug. 15, 2018.
Draper, Benjamin E., et al., "Real-Time Analysis and Signal Optimization for Charge Detection Mass Spectrometry", J. Am. Soc. Mass Spectrom. (2019) 30:898Y904.
El-Baba, Tarick J., et al., "Melting Proteins Confined in Nanodroplets With 10.6 urn Light Provided Clues About Early Steps of Denaturation", Chemical Communications, vol. 54, No. 26, 3270-3273, 2018.
Elliott, Andrew G., et al. "Simultaneous Measurements of Mass and Collisional Cross-Section of Single Ions with charge Detection Mass Spectrometry", Analytical Chemistry, vol. 89, No. 14, Jun. 16, 2017, pp. 7701-7708.
Elliott, Andrew G., et al. "Single Particle Analyzer of Mass: A Charge Detection Mass Spectrometer with a Multi-Detector Electrostatic Ion Trap", International Journal of Mass Spectrometry, Elsevier Science Publishers, Amsterdam, NL, vol. 414, Jan. 15, 2017, pp. 45-55.
Emerson, S., et al. "Hepatitis E Virus", Virology, vol. 2, Chapter 70; (4th ed., Lippincott-Raven Publishers).
European Office Action dated Jun. 26, 2024 and issued in connection with EP Patent Appln. No. 19707901.5, 8 pages.
European Office Action dated Mar. 3, 2023 for application 19732193.8—14 pages.
European Office Action dated Nov. 23, 2022 for application 19 702 773.3—5 pages.
European Office Action dated Sep. 2, 2021 for application 19 707 901.5—5 pages.
European Office Action dated Sep. 9, 2022 for application 19 702 771.7—5 pages.
European Office Action dated Sep. 9, 2022 for application 19 702 775.8—5 pages.
Examination report No. 1 issued Oct. 21, 2022 in Australian Application No. 2019281255—4 pages.
Extended European Search Report for copending application No. 21751374.6, dated Feb. 21, 2024.
Fernandez-Maestre et al. "Ammonia as a Modifier in Ion Mobility Spectrometry: Effects on Ion Mobilities and Potential as a Separation Tool", J. Chil. Chem. Soc. 2014. 59, No. 1, especially: abstract; p. 2398, col. 1, para 1; p. 2398, col. 1, para 2; p. 2398, col. 2, para 2; p. 2399, Figure 1; p. 2402, col. 1, para 1; p. 2402, col. 2, para 1; Figure 6a. Figure 6b.
Fields, Bernard, et al. "Parvoviridae: The Viruses and Their Replication" Virology, vol. 2, Chapter 69, pp. 2327-2359; 4th ed., Lippincott-Raven Publishers).
First Office Action for Counterpart Chinese Patent Application No. 2022-521245 dated Mar. 7, 2024, 9 pages, with appended English language translation.
Fuerstenau et al., "Mass Spectrometry of an Intact Virus", Agnew. Chem. 2001, 559-562.
Gao, Guangping, et al. "Clades of Adeno-Associated Viruses Are Widely Disseminated in Human Tissues", vol. 78, pp. 6381-6388 (Jun. 2004).
Gao, Guangping, et al. "Novel Adeno-Associated Viruses from Rhesus Monkeys as Vectors for Human GeneTherap",.; National Academy of Sciences, vol. 99, No.18, pp. 11854-11859 (Sep. 3, 2002).
Gorman, Linda, et al. "Stable Alteration of Pre-mRNA Splicing Patterns by Modified U7 Small Nuclear RNAs", National Academy of Sciences, vol. 95, No. 9, pp. 4929-4934 (Apr. 28, 1998).

(56) References Cited

OTHER PUBLICATIONS

Grifman, M., et al. "Incorporation of Tumor-Targeting Peptides into Recombinant Adeno-associated Virus Capsids",.; Molecular Therapy, vol. 3, No. 6, pp. 964-975 (Jun. 2001).
Grinfeld, Dmitry, et al. "Space-Charge Effects in An Electrostatic Multireflection Ion Trap", European Journal of Mass Spectrometry, vol. 20, No. 2, Apr. 1, 2014 (Apr. 1, 2014), p. 131-142.
Hauck, B., et al. "Characterization of Tissue Tropism Determinants of Adeno-Associated Virus Type 1", Journal of Virology, vol. 77, No. 4, pp. 2768-2774 (Feb. 2003).

* cited by examiner

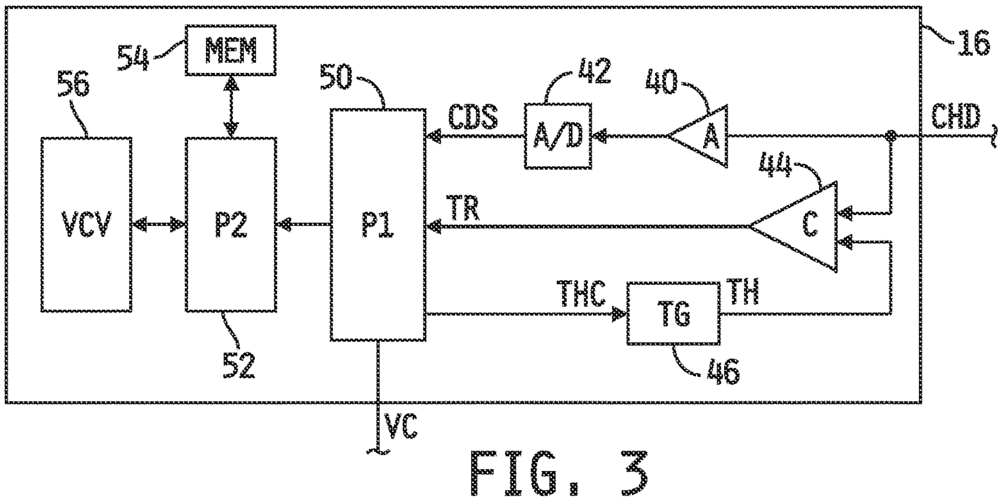
FIG. 3
FIG. 4A
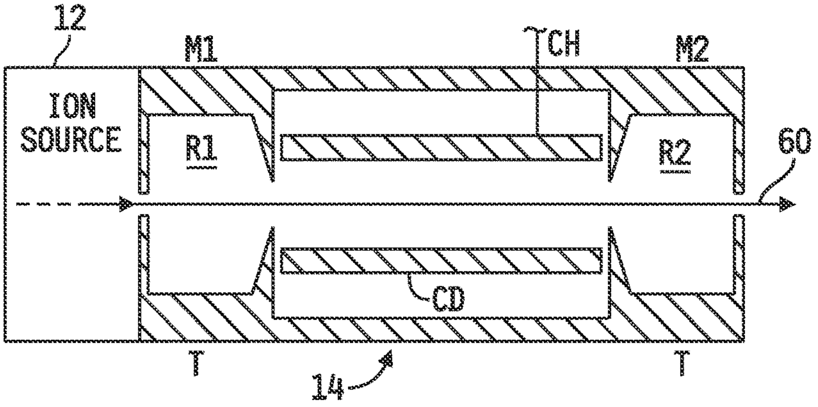
FIG. 4B
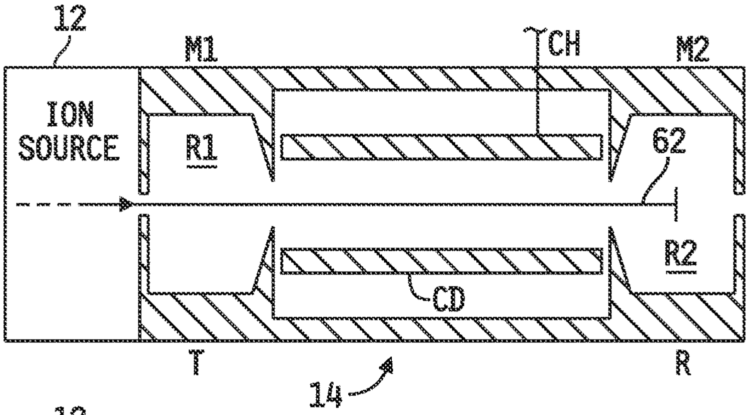
FIG. 4C
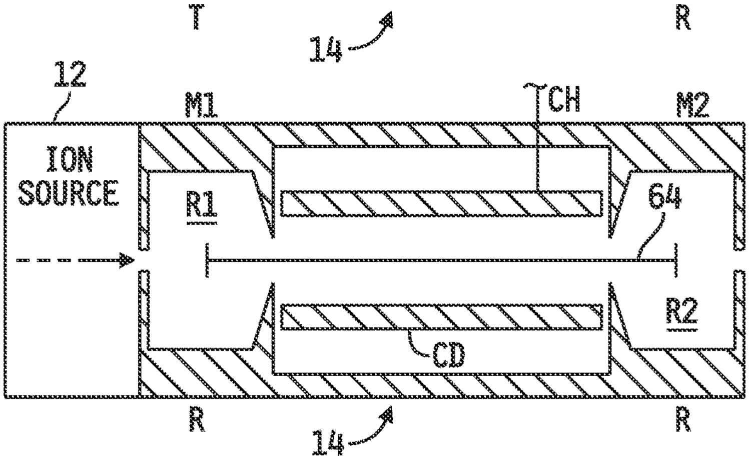

METHOD OF OPTIMIZING GEOMETRIC AND ELECTROSTATIC PARAMETERS OF AN ELECTROSTATIC LINEAR ION TRAP (ELIT)

CROSS-REFERENCE TO RELATED APPLICATIONS

This patent application is a U.S. national stage entry of PCT Application No. PCT/US2022/073503, filed Jul. 7, 2022, which claims the benefit of, and priority to, U.S. Provisional Patent Application Ser. No. 63/221,103, filed Jul. 13, 2021, the disclosures of which are expressly incorporated herein by reference in their entireties.

GOVERNMENT RIGHTS

This invention was made with government support under GM131100 awarded by the National Institutes of Health. The United States Government has certain rights in the invention.

TECHNICAL FIELD

The present disclosure relates generally to mass spectrometry instruments utilizing one or more electrostatic linear ion traps (ELITs) to simultaneously measure ion mass-to-charge ratio and ion charge, and more specifically to methods for optimizing geometric and electrostatic parameters of such one or more ELITs and to ELITs produced by such methods.

BACKGROUND

Charge detection mass spectrometry (CDMS) is a particle analysis technique in which the mass of an ion is determined by simultaneously measuring its mass-to-charge ratio, typically referred to as "m/z," and charge. In some CDMS instruments, an electrostatic linear ion trap (ELIT) is used to conduct such measurements.

SUMMARY

The present disclosure may comprise one or more of the features recited in the attached claims, and/or one or more of the following features and combinations thereof. In a first aspect, a method for optimizing an electrostatic linear ion trap (ELIT) for mass-to-charge (m/z) measurement resolution may comprise (a) determining, with a computer, initial electrostatic and geometric parameters of the ELIT, (b) modifying, with the computer, at least one of the initial electrostatic parameters to produce a resulting set of modified electrostatic parameters with which m/z measurements made by the ELIT are independent of a trajectory of ions moving within the ELIT relative to a longitudinal axis of the ELIT, (c) modifying, with the computer, at least one of the initial geometric parameters to produce a resulting set of modified geometric parameters with which m/z measurements made by the ELIT are independent of energy of ions moving within the ELIT, and (d) constructing the ELIT using the modified sets of electrostatic and geometric parameters.

A second aspect may include the features of the first aspect, and wherein (b) may comprise modifying the at least one of the initial electrostatic parameters to produce the resulting set of modified electrostatic parameters with which m/z measurements made with the ELIT are independent of the trajectory of ions moving within the ELIT with a specified ion energy.

A third aspect may include the features of the first aspect or the second aspect, and may further comprise, prior to constructing the ELIT, iteratively executing (b) and (c) to bring the modified sets of electrostatic and geometric properties into coincidence with one another so as to minimize effects of each of the modified sets of electrostatic and geometric properties on m/z measurements made by the ELIT.

A fourth aspect may include the features of any of the first through third aspects, wherein the ELIT includes a detection cylinder axially disposed between two ion mirrors, and wherein the method may further comprise determining, with a computer, a length of the detection cylinder at which an ion oscillating back and forth between the two ion mirrors, each time passing through the charge detection cylinder, does so with a 50% duty cycle in which an amount of time an spent by the ion inside the detection cylinder is equal to ½ the time it takes for the ion to travel from one of the two ion mirrors to the other of the two ion mirrors, and further constructing the ELIT using the determined length of the detection cylinder so as to optimize charge measurements made with the ELIT.

A fifth aspect may include the features of any of the first through fourth aspects, and wherein (a) may comprise determining the initial electrostatic and geometric parameters which maximize trapping efficiency and m/z resolution of the resulting ELIT.

A sixth aspect may include the features of any of the first through fifth aspects, wherein the ELIT may include a detection cylinder axially disposed between two ion mirrors, and wherein (b) may comprise (i) identifying an ion energy at which an ion oscillating back and forth between the two ion mirrors, each time passing through the charge detection cylinder, does so with an oscillation frequency that is independent of a radial offset and divergence of the ion entering the ELIT, and (ii) scaling the at least one of the initial electrostatic parameters to bring the identified ion energy to a specified ion energy.

A seventh aspect may include the features of any of the first through sixth aspects, wherein the ELIT may include a detection cylinder axially disposed between two ion mirrors, and wherein the ELIT may define a field free region between opposed ends of the two ion mirrors, and wherein (c) may comprise modifying a length of the field free region to a length at which m/z measurements made by the ELIT are independent of the energy of ions moving within the ELIT.

An eighth aspect may include the features of any of the first through seventh aspects, and may further comprise operating the constructed ELIT to measure m/z and charge of ions supplied thereto.

A ninth aspect may include the features of any of the first through seventh aspects, and may further comprise generating the ions from a sample with an ion source, and operating the constructed ELIT to measure m/z and charge of at least some of the ions generated with the ion source.

In a tenth aspect, an electrostatic linear ion trap (ELIT) may comprise first and second ion mirrors, a charge detection cylinder positioned between and axially aligned with the first and second ion mirrors along a central, longitudinal axis, at least one voltage source configured to supply voltages to each of the first and second ion mirrors to establish electric fields in each of the first and second ion mirrors to trap an ion in the ELIT with the ion oscillating back and forth between the first and second ion mirrors each time passing through the charge detection cylinder such that a mass-to-charge ratio (m/z) of the ion depends on a frequency of ion oscillation within the ELIT, wherein at least one of the voltages is selected such that the m/z of the ion is independent of a trajectory of the ion entering into and moving within the ELIT relative to the longitudinal axis, and wherein at least one geometric parameter of the ELIT is selected such that the m/z of the ion is independent of an energy of the ion entering into and moving within the ELIT.

An eleventh aspect may include the features of the tenth aspect, and wherein the at least one of the voltages is further selected such that the m/z of the ion is independent of a trajectory of the ion entering into and moving within the ELIT with a specified ion energy.

A twelfth aspect may include the features of the eleventh aspect, and wherein the at least one of the voltages is selected by identifying an ion energy at which the ion oscillating back and forth between the two ion mirrors does so with an oscillation frequency that is independent of a radial offset and divergence of the ion entering the ELIT, and then scaling the at least one of the voltages to bring the identified ion energy to the specified ion energy.

A thirteenth aspect may include the features of any of the tenth through twelfth aspects, wherein the ELIT may define a field free region between opposed ends of the two ion mirrors, and wherein the at least one geometric parameter of the ELIT may include a length of the field free region at which the m/z of the ion is independent of the energy of the ion.

A fourteenth aspect may include the features of any of the tenth through thirteenth aspects, and wherein an axial length of the detection cylinder is selected such that an amount of time an spent by the ion inside the detection cylinder is equal to ½ the time it takes for the ion to travel from one of the first and second ion mirrors to the other of the first and second ion mirrors.

In a fifteenth aspect, a charge detection mass spectrometer may comprise an ion source configured to generate ions from a sample, the ELIT of any of tenth through fourteenth aspects configured to receive at least one of the generated ions, and means for measuring the m/z of the received at least of the ions In a sixteenth aspect, an electrostatic linear ion trap (ELIT) may comprise first and second ion mirrors, an electric field free region including a charge detection cylinder positioned between the first and second ion mirrors, the first and second ion mirrors, the field free region and the charge detection cylinder axially aligned with one another along a central, longitudinal axis, the first and second ion mirrors each including a plurality of axially spaced apart electrodes, and at least one voltage source configured to supply voltages to each of the plurality of electrodes of the first and second ion mirrors to establish electric fields in each of the first and second ion mirrors to trap an ion in the ELIT such that the ion oscillates back and forth between the first and second ion mirrors each time passing through the charge detection cylinder and such that a mass-to-charge ratio (m/z) of the ion depends on a frequency of oscillation of the ion within the ELIT, wherein the voltages supplied to the plurality of electrodes of the first and second ion mirrors are selected such that the m/z of the ion is independent of a trajectory of the ion entering into and oscillating within the ELIT, and wherein a length of the electric field free region is selected such that the m/z of the ion is independent of an energy of the ion entering into and moving within the ELIT.

A seventeenth aspect may include the features of the sixteenth aspect, and wherein the voltages may be further selected such that the m/z of the ion is independent of a trajectory of the ion entering into and moving within the ELIT with a specified ion energy.

An eighteenth aspect may include the features of the seventeenth aspect, and wherein the voltages may be selected by identifying an ion energy at which the ion oscillating back and forth between the two ion mirrors does so with an oscillation frequency that is independent of a radial offset and divergence of the ion entering the ELIT, and then scaling the voltages to bring the identified ion energy to the specified ion energy.

A nineteenth aspect may include the features of any of the sixteenth through eighteenth aspects, and wherein an axial length of the detection cylinder may be selected such that an amount of time an spent by the ion inside the detection cylinder is equal to ½ the time it takes for the ion to travel from one of the first and second ion mirrors to the other of the first and second ion mirrors.

In a twentieth aspect, a charge detection mass spectrometer may comprise an ion source configured to generate ions from a sample, the ELIT of any of the fifteenth through nineteenth aspects configured to receive at least one of the generated ions, and means for measuring the m/z of the received at least of the ions.

BRIEF DESCRIPTION OF THE DRAWINGS

FIG. 3 is a simplified diagram of an embodiment of the processor illustrated in FIG. 1.

FIGS. 4A-4C are simplified diagrams of the ELIT of FIG. 1 demonstrating sequential control and operation of the ion mirrors to capture at least one ion within the ELIT and to cause the ion(s) to oscillate back and forth between the ion mirrors and through the charge detection cylinder to measure and record multiple charge detection events.

DESCRIPTION OF THE ILLUSTRATIVE EMBODIMENTS

For the purposes of promoting an understanding of the principles of this disclosure, reference will now be made to a number of illustrative embodiments shown in the attached drawings and specific language will be used to describe the same.

This disclosure relates to one or more methods for designing an electrostatic linear ion trap (ELIT) and ELITs produced by such one or more methods. For purposes of this disclosure, the phrase "charge detection event" is defined as detection of a charge induced on a charge detector of an ELIT by an ion passing a single time through the charge detector, and the phrase "ion measurement event" is defined as a collection of charge detection events resulting from oscillation of an ion back and forth through the charge detector a selected number of times or for a selected time period. As the oscillation of an ion back and forth through the charge detector results from controlled trapping of the ion within the ELIT, as will be described in detail below, the phrase "ion measurement event" may alternatively be referred to herein as an "ion trapping event" or simply as a "trapping event," and the phrases "ion measurement event," "ion trapping event", "trapping event" and variants thereof shall be understood to be synonymous with one another. For purposes of this disclosure, the terms "ion" and "charged particle," and variations thereof, will be understood to be synonymous.

Figure 1:
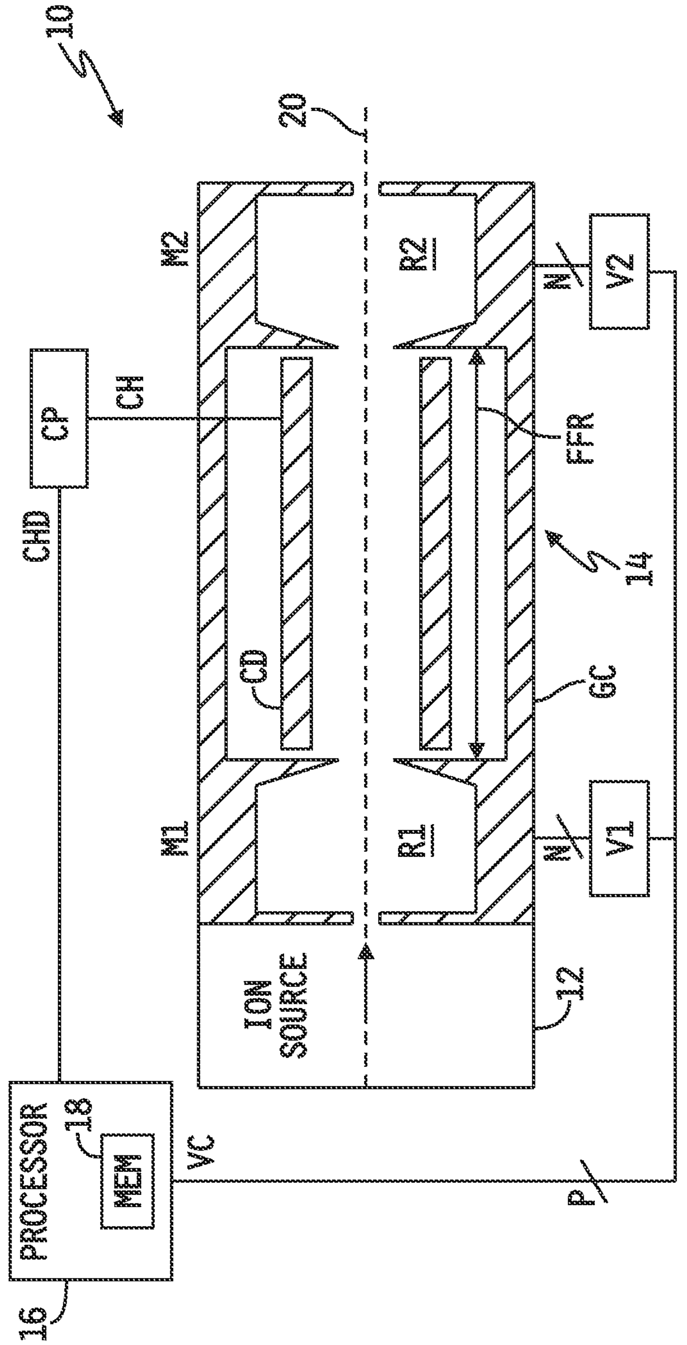
FIG. 1 is a simplified diagram of a CDMS system including an embodiment of an electrostatic linear ion trap (ELIT) with control and measurement components coupled thereto.

Referring to FIG. 1, a CDMS system 10 is shown including an embodiment of an electrostatic linear ion trap (ELIT) 14 with control and measurement components coupled to the ELIT 14. In the illustrated embodiment, the CDMS system 10 includes an ion source 12 operatively coupled to an inlet of the ELIT 14. The ion source 12 illustratively includes any conventional device or apparatus for generating ions from a sample and may further include one or more devices and/or instruments for separating, collecting, filtering, fragmenting and/or normalizing or shifting charge states of ions according to one or more molecular characteristics. As one illustrative example, which should not be considered to be limiting in any way, the ion source 12 may include a conventional electrospray ionization source, a matrix-assisted laser desorption ionization (MALDI) source or the like, coupled to an inlet of a conventional mass spectrometer. The mass spectrometer may be of any conventional design including, for example, but not limited to a time-of-flight (TOF) mass spectrometer, a reflectron mass spectrometer, a Fourier transform ion cyclotron resonance (FTICR) mass spectrometer, a quadrupole mass spectrometer, a triple quadrupole mass spectrometer, a magnetic sector mass spectrometer, or the like. In any case, the ion outlet of the mass spectrometer is operatively coupled to an ion inlet of the ELIT 14. The sample from which the ions are generated may be or include any biological or other material.

In the illustrated embodiment, the ELIT 14 illustratively includes a charge detector CD surrounded by a ground chamber or cylinder GC and operatively coupled to opposing ion mirrors M1, M2 respectively positioned at opposite ends thereof. The ion mirrors M1, M2 may alternatively be referred to herein as "endcaps" or "end caps," it being understood that the terms ion mirror and endcap (or end cap) are, for purposes of this disclosure, synonymous. The ion mirror M1 is operatively positioned between the ion source 12 and one end of the charge detector CD, and ion the mirror M2 is operatively positioned at the opposite end of the charge detector CD. Each ion mirror M1, M2 defines a respective ion mirror region R1, R2 therein. The regions R1, R2 of the ion mirrors M1, M2, the charge detector CD, and the spaces between the charge detector CD and the ion mirrors M1, M2 are axially aligned such that together they define a longitudinal axis 20 centrally therethrough which illustratively represents an ideal ion travel path through the ELIT 14 and between the ion mirrors M1, M2 as will be described in greater detail below. The region defined axially between the opposed inner surfaces of the ion mirrors M1, M2, i.e., in which the charge detector CD is positioned, illustratively defines a field-free region FFR, i.e., in which no electric field is established during the operation of the ELIT 14, as described below.

In the illustrated embodiment, voltage sources V1, V2 are electrically connected to the ion mirrors M1, M2 respectively. Each voltage source V1, V2 illustratively includes one or more switchable DC voltage sources which may be controlled or programmed to selectively produce a number, N, programmable or controllable voltages, wherein N may be any positive integer. Illustrative examples of such voltages will be described below with respect to FIGS. 2A and 2B to establish each of two different operating modes of each of the ion mirrors M1, M2 as will be described in detail below. In any case, ions move within the ELIT 14 close to the longitudinal axis 20 extending centrally through the charge detector CD and the ion mirrors M1, M2 under the influence of electric fields selectively established in the ion mirrors M1, M2 by the voltage sources V1, V2.

The voltage sources V1, V2 are illustratively shown electrically connected by a number, P, of signal paths to a conventional processor 16 including a memory 18 having instructions stored therein which, when executed by the processor 16, cause the processor 16 to control the voltage sources V1, V2 to produce desired DC output voltages for selectively establishing ion transmission and ion reflection electric fields, TEF, REF respectively, within the regions R1, R2 of the respective ion mirrors M1, M2. P may be any positive integer. In some alternate embodiments, either or both of the voltage sources V1, V2 may alternatively or additionally be programmable to selectively produce one or more constant output voltages. In other alternative embodiments, either or both of the voltage sources V1, V2 may be configured to produce one or more time-varying output voltages of any desired shape. It will be understood that more or fewer voltage sources may be electrically connected to the mirrors M1, M2 in alternate embodiments.

The charge detector CD is illustratively provided in the form of an electrically conductive cylinder, illustratively referred to herein as a charge detection cylinder, which is electrically connected to a signal input of a charge sensitive preamplifier CP, and the signal output of the charge-sensitive preamplifier CP is electrically coupled to the processor 16. The voltage sources V1, V2 are illustratively controlled in a manner, as described in detail below, which selectively traps an ion entering the ELIT 14 and causes it to oscillate therein back and forth between the ion mirrors M1, M2 such that the trapped ion repeatedly passes through the charge detector CD. With an ion so trapped within the ELIT 14 and oscillating back and forth between the ion mirrors M1, M2, the charge sensitive preamplifier CP is illustratively operable in a conventional manner to detect charges (CH) respectively induced on the charge detection cylinder CD as the ion repeatedly passes through the charge detection cylinder CD between the ion mirrors M1, M2, and to produce charge detection signals (CHD) corresponding thereto. The charge detection signals CHD are illustratively periodic and are recorded in the form of amplitude and period values and, in this regard, each amplitude and period pair represents ion measurement information for a single, respective charge detection event in which a charged particle is traveling through the charge detection cylinder CD. The amplitude is the amplitude of the charge induced by the charged particle on the charge detection cylinder as the charged particle passes therethrough, and the period value is the time duration of passage of the charged particle through the charge detection cylinder. A plurality of such amplitude and period values are measured and recorded for the trapped ion during a respective ion measurement event (i.e., during an ion trapping event), and the resulting plurality of recorded values i.e., the collection of recorded ion measurement information, for the ion measurement event, is processed to determine ion charge, mass-to-charge ratio and/or mass values as will be described below. Multiple ion measurement events can be processed in this manner, and a mass-to-charge ratio and/or mass and/or charge spectrum of the sample may illustratively be constructed therefrom.

Figure 2A:
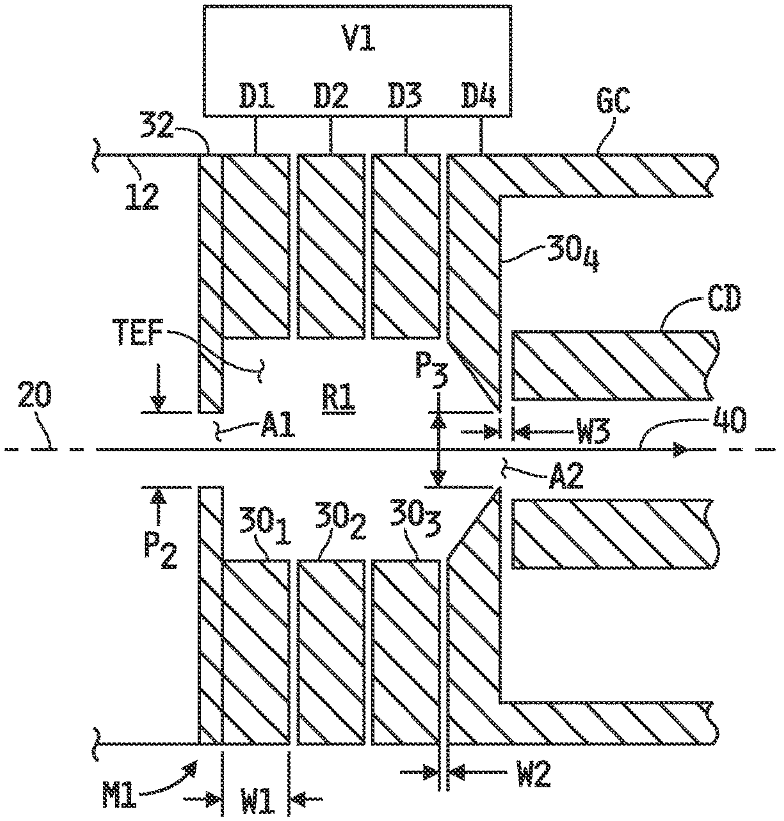
FIG. 2A is a magnified view of the ion mirror M1 of the ELIT illustrated in FIG. 1 in which the mirror electrodes of M1 are controlled to produce an ion transmission electric field therein.
Figure 2B:
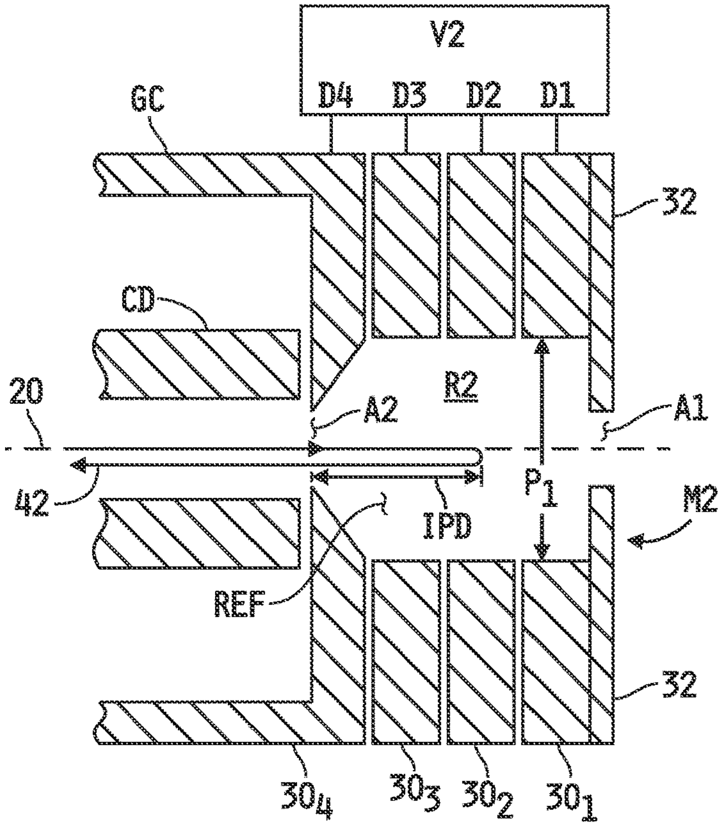
FIG. 2B is a magnified view of the ion mirror M2 of the ELIT illustrated in FIG. 1 in which the mirror electrodes of M2 are controlled to produce an ion reflection electric field therein.

Referring now to FIGS. 2A and 2B, example embodiments are shown of the ion mirrors M1, M2 respectively of the ELIT 14 depicted in FIG. 1. Illustratively, the ion mirrors M1, M2 are identical to one another in that each includes a cascaded arrangement of 4 spaced-apart, electrically conductive mirror electrodes. For each of the ion mirrors M1, M2, a first mirror electrode $\mathbf{30}_1$ has a thickness W1 and defines a passageway, e.g., an end cap inner diameter, centrally therethrough of diameter P1. An end plate 32 is affixed or otherwise coupled to an outer surface of the first mirror electrode $\mathbf{30}_1$ and defines an aperture A1 centrally therethrough which serves as an ion entrance to and/or exit from the corresponding ion mirror M1, M2 respectively. In the case of the ion mirror M1, the end plate 32 is coupled to, or is part of, an ion exit of the ion source 12 illustrated in FIG. 1. The aperture A1 for each end plate 32 illustratively has a diameter P2.

A second mirror electrode $\mathbf{30}_2$ of each ion mirror M1, M2 is spaced apart from the first mirror electrode $\mathbf{30}_1$ by a space having width W2. The second mirror electrode $\mathbf{30}_2$, like the mirror electrode $\mathbf{30}_1$, has thickness W1 and defines a passageway centrally therethrough of diameter P1. A third mirror electrode $\mathbf{30}_3$ of each ion mirror M1, M2 is likewise spaced apart from the second mirror electrode $\mathbf{30}_2$ by a space of width W2. The third mirror electrode $\mathbf{30}_3$ has thickness W1 and defines a passageway centrally therethrough of width P1.

A fourth mirror electrode $\mathbf{30}_4$ is spaced apart from the third mirror electrode $\mathbf{30}_3$ by a space of width W2. The fourth mirror electrode $\mathbf{30}_4$ illustratively has a thickness of W1 and is formed by a respective end of the ground cylinder, GC disposed about the charge detector CD. The fourth mirror electrode $\mathbf{30}_4$ defines an aperture A2 centrally therethrough which is illustratively conical in shape and increases linearly between the internal and external faces of the ground cylinder GC from a diameter P3 defined at the internal face of the ground cylinder GC to the diameter P1 at the external face of the ground cylinder GC (which is also the internal face of the respective ion mirror M1, M2). In some alternate embodiments, the fourth mirror electrode $\mathbf{30}_4$ may be identical to the mirror electrodes $\mathbf{30}_1$-$\mathbf{30}_4$, such that the fourth mirror electrode $\mathbf{30}_4$ defines the inner diameter P1 therethrough, and in such embodiments an end plate, e.g., similar to the end plate 32, may be affixed or otherwise coupled to an outer surface of the fourth mirror electrode $\mathbf{30}_4$ (i.e., that facing the charge detector CD), wherein the end plate defines the aperture A2 centrally therethrough.

The spaces defined between the mirror electrodes $\mathbf{30}_1$-$\mathbf{30}_4$ may be voids in some embodiments, i.e., vacuum gaps, and in other embodiments such spaces may be filled with one or more electrically non-conductive, e.g., dielectric, materials. The mirror electrodes $\mathbf{30}_1$-$\mathbf{30}_4$ and the end plates 32 are axially aligned, i.e., collinear, such that a longitudinal axis 22 passes centrally through each aligned passageway and also centrally through the apertures A1, A2. In embodiments in which the spaces between the mirror electrodes $\mathbf{30}_1$-$\mathbf{30}_4$ include one or more electrically non-conductive materials, such materials will likewise define respective passageways therethrough which are axially aligned, i.e., collinear, with the passageways defined through the mirror electrodes $\mathbf{30}_1$-$\mathbf{30}_4$ and which illustratively have diameters of P2 or greater. Illustratively, P1>P3>P2, although in other embodiments other relative diameter arrangements are possible. In some embodiments, the thicknesses of the mirror electrodes $\mathbf{30}_1$-$\mathbf{30}_4$ are identical, e.g., all W1, although in alternate embodiments one or more of the mirror electrodes $\mathbf{30}_1$-$\mathbf{30}_4$ may have a thickness that differs from one or more of the remaining mirror electrodes $\mathbf{30}_1$-$\mathbf{30}_4$. In some embodiments, A1=A2, although in alternate embodiments A1 may be greater to or lesser than A2. Although the ion mirrors M1, M2 are each shown as having four mirror electrodes $\mathbf{30}_1$-$\mathbf{30}_4$, it will be understood that in alternate embodiments the ion mirrors M1, M2 may include more or fewer such mirror electrodes.

A region R1 is defined between the apertures A1, A2 of the ion mirror M1, and another region R2 is likewise defined between the apertures A1, A2 of the ion mirror M2. The regions R1, R2 are illustratively identical to one another in shape and in volume.

As described above, the charge detector CD is illustratively provided in the form of an elongated, electrically conductive cylinder positioned and spaced apart between corresponding ones of the ion mirrors M1, M2 by a space of width W3. In one embodiment, W1>W3>W2, and P1>P3>P2, although in alternate embodiments other relative width arrangements are possible. In any case, the longitudinal axis 20 illustratively extends centrally through the passageway defined through the charge detection cylinder CD, such that the longitudinal axis 20 extends centrally through the combination of the ion mirrors M1, M2 and the charge detection cylinder CD. The axial length, ML, of each ion mirror M1 is thus ML=4W1+3W2, and the axial length, FFL, of the field free drift region FFR is thus FFL=2W3+CDL, where CDL is the axial length of the charge detection cylinder CD.

In operation, the ground cylinder GC is illustratively controlled to ground potential such that the fourth mirror electrode $\mathbf{30}_4$ of each ion mirror M1, M2 is at ground potential at all times. In some alternate embodiments, the fourth mirror electrode $30_4$ of either or both of the ion mirrors M1, M2 may be set to any desired DC reference potential, or to a switchable DC or other time-varying voltage source.

In the embodiment illustrated in FIGS. 2A and 2B, the voltage sources V1, V2 are each configured to each produce four DC voltages D1-D4, and to supply the voltages D1-D4 to a respective one of the mirror electrodes $30_1$-$30_4$ of the respective ion mirror M1, M2. In some embodiments in which one or more of the mirror electrodes $30_1$-$30_4$ is to be held at ground potential at all times, the one or more such mirror electrodes $30_1$-$30_4$ may alternatively be electrically connected to the ground reference of the respective voltage supply V1, V2 and the corresponding one or more voltage outputs D1-D4 may be omitted. Alternatively or additionally, in embodiments in which any two or more of the mirror electrodes $30_1$-$30_4$ are to be controlled to the same non-zero DC values, any such two or more mirror electrodes $30_1$-$30_4$ may be electrically connected to a single one of the voltage outputs D1-D4 and superfluous ones of the output voltages D1-D4 may be omitted.

Each ion mirror M1, M2 is illustratively controllable and switchable, by selective application of the voltages D1-D4, between an ion transmission mode (as illustrated by example in FIG. 2A) in which the voltages D1-D4 produced by the respective voltage source V1, V2 establishes an ion transmission electric field (TEF) in the respective region R1, R2 thereof, and an ion reflection mode (as illustrated by example in FIG. 2B) in which the voltages D1-D4 produced by the respect voltage source V1, V2 establishes an ion reflection electric field (REF) in the respective region R1, R2 thereof. The region FFR defined between the ion mirrors M1, M2, in which the charge detection cylinder CD resides, illustratively remains electric field-free at all times as described above. As illustrated by example in FIG. 2A, once an ion (e.g., a charged particle) from the ion source 12 flies into the region R1 of the ion mirror M1 through the inlet aperture A1 of the ion mirror M1, the ion is focused toward the longitudinal axis 20 of the ELIT 14 by an ion transmission electric field TEF established in the region R1 of the ion mirror M1 via selective control of the voltages D1-D4 of V1. As a result of the focusing effect of the transmission electric field TEF in the region R1 of the ion mirror M1, the ion exiting the region R1 of the ion mirror M1 through the aperture A2 of the ground chamber GC attains a narrow trajectory into and through the charge detector CD, i.e., so as to maintain a path of ion travel through the charge detector CD that is close to the longitudinal axis 20. An identical ion transmission electric field TEF may, at times, be selectively established within the region R2 of the ion mirror M2 via like control of the voltages D1-D4 of the voltage source V2. In the ion transmission mode, an ion entering the region R2 from the charge detection cylinder CD via the aperture A2 of M2 is focused toward the longitudinal axis 20 by the ion transmission electric field TEF within the region R2 so that the ion exits the aperture A1 of the ion mirror M2.

As illustrated by example in FIG. 2B, an ion reflection electric field REF established in the region R2 of the ion mirror M2 via selective control of the voltages D1-D4 of V2 acts to decelerate and stop an ion entering the ion region R2 from the charge detection cylinder CD via the ion inlet aperture A2 of M2, to accelerate the stopped ion in the opposite direction back through the aperture A2 of M2 and into the end of the charge detection cylinder CD adjacent to M2 as depicted by the ion trajectory 42, and to focus the ion toward the central, longitudinal axis 20 within the region R2 of the ion mirror M2 so as to maintain a narrow trajectory of the ion back through the charge detector CD toward the ion mirror M1. The distance that the ion penetrates the ion mirror M2, relative to the surface of the mirror electrode $30_4$ facing the charge detection cylinder CD, before reversing direction as illustrated in FIG. 2B, will be referred to herein as the ion penetration depth IPD.

An identical ion reflection electric field REF may, at times, e.g., during a trapping event, be selectively established within the region R1 of the ion mirror M1 via like control of the voltages D1-D4 of the voltage source V1. In the ion reflection mode, an ion entering the region R1 from the charge detection cylinder CD via the aperture A2 of M1 is decelerated and stopped by the ion reflection electric field REF established within the region R1, then accelerated in the opposite direction back through the aperture A2 of M1 and into the end of the charge detection cylinder CD adjacent to M1, and focused toward the central, longitudinal axis 20 within the region R1 of the ion mirror M1 so as to maintain a narrow trajectory of the ion back through the charge detector CD toward the ion mirror M1. An ion that traverses the length of the ELIT 14 and is reflected by the ion reflection electric field REF in the ion regions R1, R2 in a manner that enables the ion to continue traveling back and forth through the charge detection cylinder CD between the ion mirrors M1, M2 as just described is considered to be trapped within the ELIT 14.

While the ion mirrors M1, M2 and the charge detection cylinder CD are illustrated in FIGS. 1-2B as defining cylindrical passageways therethrough, it will be understood that in alternate embodiments either or both of the ion mirrors M1, M2 and/or the charge detection cylinder CD may define non-cylindrical passageways therethrough such that one or more of the passageway(s) through which the longitudinal axis 20 centrally passes represents a cross-sectional area and profile that is not circular (as it is in the embodiment illustrated in FIGS. 1-2B). In still other embodiments, regardless of the shape of the cross-sectional profiles, the cross-sectional areas of the passageway defined through the ion mirror M1 may be different from the passageway defined through the ion mirror M2.

Referring now to FIG. 3, an embodiment is shown of the processor 16 illustrated in FIG. 1. In the illustrated embodiment, the processor 16 includes a conventional amplifier circuit 40 having an input receiving the charge detection signal CHD produced by the charge sensitive preamplifier CP and an output electrically connected to an input of a conventional Analog-to-Digital (A/D) converter 42. An output of the A/D converter 42 is electrically connected to a processor 50 (P1). The amplifier 40 is operable in a conventional manner to amplify the charge detection signal CHD produced by the charge sensitive preamplifier CP, and the A/D converter is, in turn, operable in a conventional manner to convert the amplified charge detection signal to a digital charge detection signal CDS.

The processor 16 illustrated in FIG. 3 further includes a conventional comparator 44 having a first input receiving the charge detection signal CHD produced by the charge sensitive preamplifier CP, a second input receiving a threshold voltage CTH produced by a threshold voltage generator (TG) 46 and an output electrically connected to the processor 50. The comparator 44 is operable in a conventional manner to produce a trigger signal TR at the output thereof which is dependent upon the magnitude of the charge detection signal CDH relative to the magnitude of the threshold voltage CTH. In one embodiment, for example, the comparator 44 is operable to produce an "inactive"

trigger signal TR at or near a reference voltage, e.g., ground potential, as long as CHD is less than CTH, and is operable to produce an "active" TR signal at or near a supply voltage of the circuitry 40, 42, 44, 46, 50 or otherwise distinguishable from the inactive TR signal when CHD is at or exceeds CTH. In alternate embodiments, the comparator 44 may be operable to produce an "inactive" trigger signal TR at or near the supply voltage as long as CHD is less than CTH, and is operable to produce an "active" trigger signal TR at or near the reference potential when CHD is at or exceeds CTH. Those skilled in the art will recognize other differing trigger signal magnitudes and/or differing trigger signal polarities that may be used to establish the "inactive" and "active" states of the trigger signal TR so long as such differing trigger signal magnitudes and/or different trigger signal polarities are distinguishable by the processor 50, and it will be understood that any such other different trigger signal magnitudes and/or differing trigger signal polarities are intended to fall within the scope of this disclosure. In any case, the comparator 44 may additionally be designed in a conventional manner to include a desired amount of hysteresis to prevent rapid switching of the output between the reference and supply voltages.

The processor 50 is illustratively operable to produce a threshold voltage control signal THC and to supply THC to the threshold generator 46 to control operation thereof. In some embodiments, the processor 50 is programmed or programmable to control production of the threshold voltage control signal THC in a manner which controls the threshold voltage generator 46 to produce CTH with a desired magnitude and/or polarity. In other embodiments, a user may provide the processor 50 with instructions in real time, e.g., through a downstream processor, e.g., via a virtual control and visualization unit, to control production of the threshold voltage control signal THC in a manner which controls the threshold voltage generator 46 to produce CTH with a desired magnitude and/or polarity. In either case, the threshold voltage generator 46 is illustratively implemented, in some embodiments, in the form of a conventional controllable DC voltage source configured to be responsive to a digital form of the threshold control signal THC, e.g., in the form of a single serial digital signal or multiple parallel digital signals, to produce an analog threshold voltage CTH having a polarity and a magnitude defined by the digital threshold control signal THC. In some alternate embodiments, the threshold voltage generator 46 may be provided in the form of a conventional digital-to-analog (D/A) converter responsive to a serial or parallel digital threshold voltage TCH to produce an analog threshold voltage CTH having a magnitude, and in some embodiments a polarity, defined by the digital threshold control signals THC. In some such embodiments, the D/A converter may form part of the processor 50. Those skilled in the art will recognize other conventional circuits and techniques for selectively producing the threshold voltage CTH of desired magnitude and/or polarity in response to one or more digital and/or analog forms of the control signal THC, and it will be understood that any such other conventional circuits and/or techniques are intended to fall within the scope of this disclosure.

In addition to the foregoing functions performed by the processor 50, the processor 50 is further operable to control the voltage sources V1, V2 as described above with respect to FIGS. 2A, 2B to selectively establish ion transmission and reflection fields within the regions R1, R2 of the ion mirrors M1, M2 respectively. In some embodiments, the processor 50 is programmed or programmable to control the voltage sources V1, V2. In other embodiments, the voltage source(s) V1 and/or V2 may be programmed or otherwise controlled in real time by a user, e.g., through a downstream processor 52, e.g., via a virtual control and visualization unit. In either case, the processor 50 is, in one embodiment, illustratively provided in the form of a field programmable gate array (FPGA) programmed or otherwise instructed by a user to collect and store charge detection signals CDS for charge detection events and for ion measurement events, to produce the threshold control signal(s) TCH from which the magnitude and/or polarity of the threshold voltage CTH is determined or derived, and to control the voltage sources V1, V2. In this embodiment, the memory 18 described with respect to FIG. 1 is integrated into, and forms part of, the programming of the FPGA. In alternate embodiments, the processor 50 may be provided in the form of one or more conventional microprocessors or controllers and one or more accompanying memory units having instructions stored therein which, when executed by the one or more microprocessors or controllers, cause the one or more microprocessors or controllers to operate as just described. In other alternate embodiments, the processing circuit 50 may be implemented purely in the form of one or more conventional hardware circuits designed to operate as described above, or as a combination of one or more such hardware circuits and at least one microprocessor or controller operable to execute instructions stored in memory to operate as described above.

The embodiment of the processor 16 depicted in FIG. 3 further illustratively includes a second processor 52 coupled to the first processor 50 and also to at least one memory unit 54. In some embodiments, the processor 52 may include one or more peripheral devices, such as a display monitor, one or more input and/or output devices or the like, although in other embodiments the processor 52 may not include any such peripheral devices. In any case, the processor 52 is illustratively configured, i.e., programmed, to execute at least one process for analyzing ion measurement events. Data in the form of charge magnitude and charge timing data (i.e., detection of the timing of charges induced by the ion on the charge detection cylinder relative to one another) received by the processor 50 via the charge detection signals CDS is illustratively transferred from the processor 50 directly to the processor 52 for processing and analysis upon completion of each ion measurement event.

In some embodiments, the processor 52 is illustratively provided in the form of a high-speed server operable to perform both collection/storage and analysis of such data. In such embodiments, one or more high-speed memory units 54 may be coupled to the processor 52, and is/are operable to store data received and analyzed by the processor 52. In one embodiment, the one or more memory units 54 illustratively include at least one local memory unit for storing data being used or to be used by the processor 52, and at least one permanent storage memory unit for storing data long term. In one such embodiment, the processor 52 is illustratively provided in the form of a Linux® server (e.g., OpenSuse Leap 42.1) with four Intel® Xeon™ processors (e.g., E5-465L v2, 12 core, 2.4 GHZ). In this embodiment, an improvement in the average analysis time of a single ion measurement event file of over 100× is realized as compared with a conventional Windows® PC (e.g., i5-2500K, 4 cores, 3.3 GHZ). Likewise, the processor 52 of this embodiment together with high speed/high performance memory unit(s) 54 illustratively provide for an improvement of over 100× in data storage speed. Those skilled in the art will recognize one or more other high-speed data processing and analysis systems that may be implemented as the processor 52, and it will be understood that any such one or more other high-speed data processing and analysis systems are intended to fall within the scope of this disclosure. In alternate embodiments, the processor 52 may be provided in the form of one or more conventional microprocessors or controllers and one or more accompanying memory units having instructions stored therein which, when executed by the one or more microprocessors or controllers, cause the one or more microprocessors or controllers to operate as described herein.

In the illustrated embodiment, the memory unit 54 illustratively has instructions stored therein which are executable by the processor 52 to analyze ion measurement event data produced by the ELIT 14 to determine ion mass spectral information for a sample under analysis. In one embodiment, the processor 52 is operable to receive ion measurement event data from the processor 50 in the form of charge magnitude and charge detection timing information measured during each of multiple "charge detection events" (as this term is defined above) making up the "ion measurement event" (as this term is defined above), and to process such charge detection events making up such an ion measurement event to determine ion charge and mass-to-charge data, and to then determine ion mass data therefrom. Multiple ion measurement events may be processed in like manner to create mass spectral information for the sample under analysis.

As briefly described above with respect to FIGS. 2A and 2B, the voltage sources V1, V2 are illustratively controlled by the processor 50, e.g., via the processor 52, in a manner which selectively establishes ion transmission and ion reflection electric fields in the region R1 of the ion mirror M1 and in the region R2 of the ion mirror M2 to guide ions introduced into the ELIT 14 from the ion source 12 through the ELIT 14, and to then cause a single ion to be selectively trapped and confined within the ELIT 14 such that the trapped ion repeatedly passes through the charge detector CD as it oscillates back and forth between M1 and M2. Referring to FIGS. 4A-4C, simplified diagrams of the ELIT 14 of FIG. 1 are shown depicting an example of such sequential control and operation of the ion mirrors M1, M2 of the ELIT 14. In the following example, the processor 52 will be described as controlling the operation of the voltage sources V1, V2 in accordance with its programming, although it will be understood that the operation of the voltage source V1 and/or the operation of the voltage source V2 may be virtually controlled, at least in part, by the processor 50.

As illustrated in FIG. 4A, the ELIT control sequence begins with the processor 52 controlling the voltage source V1 to control the ion mirror M1 to the ion transmission mode of operation (T) by establishing an ion transmission field within the region R1 of the ion mirror M1, and also controlling the voltage source V2 to control the ion mirror M2 to the ion transmission mode of operation (T) by likewise establishing an ion transmission field within the region R2 of the ion mirror M2. As a result, ions generated by the ion source 12 pass into the ion mirror M1 and are focused by the ion transmission field established in the region R1 toward the longitudinal axis 20 as they pass into the charge detection cylinder CD. The ions then pass through the charge detection cylinder CD and into the ion mirror M2 where the ion transmission field established within the region R2 of M2 focusses the ions toward the longitudinal axis 20 such that the ions pass through the exit aperture A1 of M2 as illustrated by the ion trajectory 60 depicted in FIG. 4A.

Referring now to FIG. 4B, after both of the ion mirrors M1, M2 have been operating in ion transmission operating mode for a selected time period and/or until successful ion transmission therethrough has been achieved (e.g., by monitoring the charge detection signal CDS to determine the presence of charged particles passing through the charge detection cylinder CD), the processor 52 is illustratively operable to control the voltage source V2 to control the ion mirror M2 to the ion reflection mode (R) of operation by establishing an ion reflection field within the region R2 of the ion mirror M2, while maintaining the ion mirror M1 in the ion transmission mode (T) of operation as shown. As a result, at least one ion generated by the ion source 12 enters into the ion mirror M1 and is focused by the ion transmission field established in the region R1 toward the longitudinal axis 20 such that the at least one ion passes through the ion mirror M1 and into the charge detection cylinder CD as just described with respect to FIG. 4A. The ion(s) then pass(es) through the charge detection cylinder CD and into the ion mirror M2 where the ion reflection field established within the region R2 of M2 reflects the ion(s) to cause it/them to reverse travel so as to travel in the opposite direction and back into the charge detection cylinder CD, as illustrated by the ion trajectory 62 in FIG. 4B.

Referring now to FIG. 4C, after the ion reflection electric field has been established in the region R2 of the ion mirror M2, the processor 52 is operable to control the voltage source V1 to control the ion mirror M1 to the ion reflection mode (R) of operation by establishing an ion reflection field within the region R1 of the ion mirror M1, while maintaining the ion mirror M2 in the ion reflection mode (R) of operation in order to trap the ion(s) within the ELIT 14 such that the ion(s) oscillates back and forth between the ion mirrors M1, M2 each time passing through the charge detection cylinder CD. As illustrated by example in FIG. 2B, the ion penetrates into the ion mirror M2 by the distance IPD (Ion Penetration Depth) before reversing direction, and as the ion mirrors M1, M2 are controlled identically in the reflection mode the ion likewise penetrates into the ion mirror M1 by the distance IPD before reversing direction.

In some embodiments, the processor 52 is illustratively operable, i.e., programmed, to control the ELIT 14 in a "random trapping mode" or "continuous trapping mode" in which the processor 52 is operable to control the ion mirror M1 to the reflection mode (R) of operation after the ELIT 14 has been operating in the state illustrated in FIG. 4B, i.e., with M1 in ion transmission mode and M2 in ion reflection mode, for a selected time period. Until the selected time period has elapsed, the ELIT 14 is controlled to operate in the state illustrated in FIG. 4B. In other embodiments, the processor 52 is operable, i.e., programmed, to control the ELIT 14 in a "trigger trapping mode" which illustratively carries a substantially greater probability of trapping a single ion therein as compared to the random trapping mode. In the "trigger trapping mode," the processor 52 is operable to control the ion mirror M1 to the reflection mode (R) of operation after an ion has been detected as passing through the charge detection cylinder CD.

In any case, with both of the ion mirrors M1, M2 controlled to the ion reflection operating mode (R) to trap an ion within the ELIT 14, the ion is caused by the opposing ion reflection fields established in the regions R1 and R2 of the ion mirrors M1 and M2 respectively to oscillate back and forth between the ion mirrors M1 and M2, each time passing through the charge detection cylinder CD as illustrated by the ion trajectory 64 depicted in FIG. 4C and as described above. In one embodiment, the processor 50 is operable to maintain the operating state illustrated in FIG. 4C until the ion passes through the charge detection cylinder CD a selected number of times. In an alternate embodiment, the processor 50 is operable to maintain the operating state illustrated in FIG. 4C for a selected time period after controlling M1 (and M2 in some embodiments) to the ion reflection mode (R) of operation. In either embodiment, the number of cycles or time spent in the state illustrated in FIG. 4C may illustratively be programmed, e.g., via instructions stored in the memory 54, or controlled via a user interface, and in any case the ion detection event information resulting from each pass by the ion through the charge detection cylinder CD is temporarily stored in the processor 50, e.g., in the form of an ion measurement file which may illustratively have a predefined data or sample length. When the ion has passed through the charge detection cylinder CD a selected number of times or has oscillated back-and-forth between the ion mirrors M1, M2 for a selected period of time, the total number of charge detection events stored in the processor 50 defines an ion measurement event and, upon completion of the ion measurement event, the stored ion detection events defining the ion measurement event, e.g., the ion measurement event file, is passed to, or retrieved by, the processor 52. The sequence illustrated in FIGS. 4A-4C then returns to that illustrated in FIG. 4A where the voltage sources V1, V2 are controlled as described above to control the ion mirrors M1, M2 respectively to the ion transmission mode (T) of operation by establishing ion transmission fields within the regions R1, R2 of the ion mirrors M1, M2 respectively. The illustrated sequence then repeats for as many times as desired.

In some embodiments, the ion measurement event files are analyzed in the frequency domain using a Fast Fourier Transform (FFT) algorithm. In such implementations, the mass-to-charge ratio (m/z) of the ion is determined from the oscillation frequency (f0) of the ion measurement event data using a calibration constant (C) (Equation 1), the charge of the ion is determined by the magnitude of the fundamental frequency peak in the FFT and the mass of the ion is determined as a product of m/z and the ion charge.

$$\frac{m}{z} = \frac{C}{f_0^2} \qquad \text{Equation 1}$$

In alternate embodiments, the signal measurements contained in the ion measurement event files may be analyzed in the time domain, in conjunction with the FFT, in a manner which incorporates information contained within higher order harmonics by fitting the signal measurements to a simulated waveform to more precisely measure the ion charge. Details relating to one example process for carrying out such a time-domain analysis can be found in co-pending WO 2021/158676A1, filed Feb. 3, 2021, the disclosure of which is expressly incorporated herein by reference in its entirety.

For purposes of this disclosure, the resolving power, RP, of the ELIT 14 is defined as a ratio of the average mass-to-charge ratio, m/z, of a peak and its full width at half maximum (FWHM) according to equation 2:

$$RP = ave(m/z)/FWHM \qquad \text{Equation 2}$$

In addition to the m/z, an ion's oscillation frequency $f_0$ in the ELIT 14 depends on the kinetic energy of the ion entering the ELIT 14 from the ion source 12 and on the ion's trajectory into and within the ELIT 14. Variations in these factors can combine to degrade the m/z resolving power RP of the ELIT 14. Reducing the dependence of the ELIT oscillation frequency on the ion energy is related to the problem encountered in time-of-flight mass spectrometry where the goal is to reduce the dependence of the ion's flight time to the detector plane on the ion energy. If, for example, uniform electric fields are established in the regions R1, R2 of the ELIT 14, the oscillation frequency will be independent of small variations in the ion energy if the penetration depth IPD is equal to one-quarter of the length of the field free region, FFR. With this condition met, a small increase in the ion energy leads to a slightly smaller transit time through the field free region FFR, but this change is compensated by slightly longer time (a slightly larger penetration depth IPD) in the regions R1, R2. However, such uniform electric fields in the regions R1, R2 are not practical for CDMS because they would only trap ions with trajectories that are parallel to the trap axis 20. The vast majority of the ions could not be trapped, and it would take too long to acquire a mass spectrum. Thus, it is necessary to introduce a radial component to the electric fields to focus ions that enter the trap with a radial offset and angular divergence toward the axis 20 as briefly described above. The ion trajectories then undergo a Lissajous-like motion, the details of which depend on the entering ion's trajectory. Such different ion trajectories, however, have slightly different oscillation frequencies, which degrades the m/z resolution.

A previous ELIT design, an example of which is disclosed in co-pending U.S. Pat. No. 11,232,941, the disclosure of which is expressly incorporated herein by reference in its entirety, was configured to optimize the accuracy of the charge measurement and at the same time reduce the contribution to the m/z resolution from the ion energy distribution. However, no effort was made to minimize the contribution to the m/z resolution from the ion trajectory distribution and the best m/z resolving power, under normal operating conditions, was around 330. Below is described a method for optimizing geometric and electrostatic parameters of a cylindrical ELIT 14 which makes the ion oscillation frequency, and thus the measured m/z, highly resistant to change with variations in the energy and the trajectory of trapped ions while, in some embodiments, preserving features of the design that give rise to a high charge resolution. In embodiments in which the ELIT 14 is designed to resist changes to the ion oscillation frequency with variations in ion energy and/or trajectory and to also optimize charge measurement accuracy, the resulting ELIT 14 achieves a resolving power of over 300,000 in m/z and mass resolving power. This represents a 1000-fold improvement over the best cylindrical ELITs previously used for CDMS of megadalton-sized particles.

Figure 5:
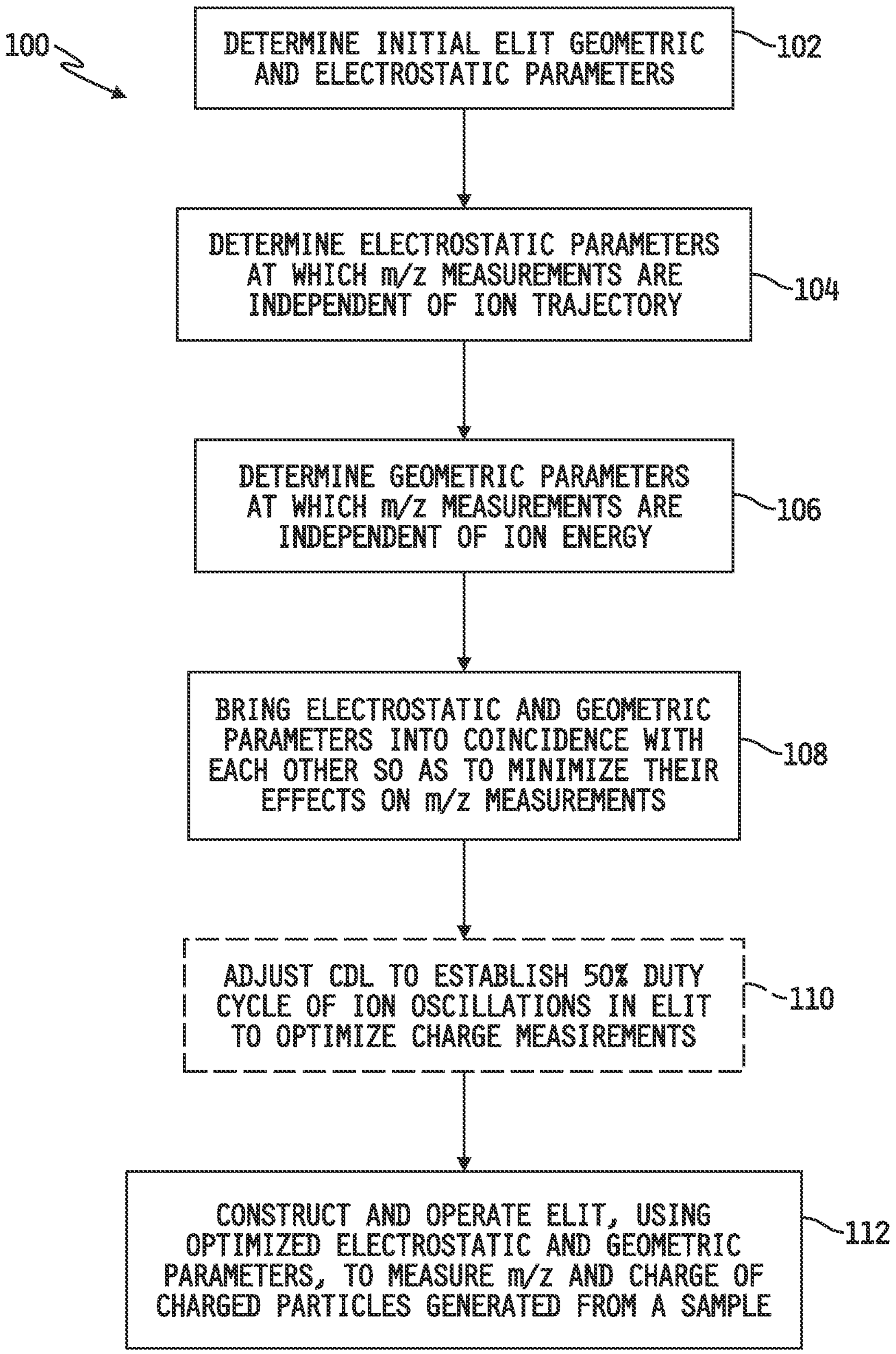
FIG. 5 is a simplified flow diagram depicting an embodiment of a process for optimizing geometric and electrostatic parameters of the ELIT illustrated in FIGS. 1-4C for the purpose of increasing at least one of mass-to-charge and charge measurement resolution.

Referring now to FIG. 5, a simplified flowchart is shown of a process 100 for optimizing geometric and electrostatic parameters of the ELIT 14 illustrated in FIGS. 1-4C for the purpose of increasing the m/z resolving power of the ELIT 14. In some embodiments, as illustrated by dashed-line process representation in FIG. 5, the process 100 may also include at least one process step for optimizing geometric parameters of the ELIT 14 to additionally increase charge measurement accuracy. The process 100 is illustratively stored in the memory 54 in the form of instructions executable by the processor P2 (or P1), or is stored in an off-board memory and executed by an off-board processor, to optimize the geometric and electrostatic parameters of the ELIT 14 as just described. For purposes of the following description, the process 100 will be described as being executed by the processor 52, although it will be understood that the process 100 may alternatively be executed by the processor 50 or by one or more processors not coupled to the instrument 10 illustrated in FIG. 1.

In the illustrated embodiment, the process 100 begins at step 102 where the processor 52 is operable to determine initial geometric and electrostatic parameters of the ELIT 14. The initial geometric parameters illustratively include all dimensional parameters of the various parts and sub-parts of the ELIT 14, and the initial electrostatic parameters illustratively include the electrical conditions applied to the ELIT 14, e.g., the voltages (and/or currents) applied to the various electrodes $30_1$-$30_4$ of the ion mirrors M1, M2.

In one illustrative example of step 102, the initial geometric and electrostatic parameters were optimized using the simplex optimizer in SIMION 2019 to maximize trapping efficiency and m/z resolution, while maintaining a 50% duty cycle signal. Geometric parameters that were varied included the thicknesses of the endcap electrodes $30_1$-$30_4$, their inner diameters, and the length of the detection cylinder CDL. Endcap voltages, D1-D4, for transmission mode (where ions are let into the trap) and reflection or trapping mode (where ions are reflected by the endcaps) were simultaneously optimized to maximize the m/z resolving power for a nominal, i.e., specified, ion energy of 130 eV/z.

Example sets of output voltages D1-D4 resulting from step 102, i.e., to be produced by the voltage sources V1, V2 respectively to control a respective ion mirrors M1, M2 to the ion transmission and reflection modes described above, are shown in TABLE I below. It will be understood that the following values of D1-D4 are provided only by way of example, and that other values of one or more of D1-D4 may alternatively be used.

TABLE I

| Ion Mirror Operating Mode | Output Voltages (volts DC) |
|---|---|
| Transmission | V1: D1 = 0, D2 = 95, D3 = 135, D4 = 0 |
| | V2: D1 = 0, D2 = 95, D3 = 135, D4 = 0 |
| Reflection | V1: D1 = 190, D2 = 125, D3 = 135, D4 = 0 |
| | V2: D1 = 190, D2 = 125, D3 = 135, D4 = 0 |

The ion trajectories were calculated with a home-written Fortran code that utilizes the Beeman algorithm for propagating ion trajectories in three dimensions. At each time step, the ion's radial position was projected onto a two-dimensional electric field array consisting of a slice of the cylindrical trap. A bicubic interpolation was then used to calculate the electric field components. The resulting forces were fed into the Beeman algorithm for each simulation time step.

From step 102, the process 100 advances to step 104 where the processor 52 is operable to determine electrostatic parameters at which the resulting mass-to-charge ratio (m/z) measurements made by the ELIT 14 are independent of ion trajectory. The processor 52 is illustratively operable at step 104 to modify at least one of the initial electrostatic parameters determined at step 102 to produce a resulting set of modified electrostatic parameters with which mass-to-charge (m/z) ratio measurements made by the ELIT 14 are independent of ion trajectory, i.e., of the trajectory of ions moving within the ELIT 14 relative to the longitudinal axis 20 of the ELIT 14. Step 104 is illustratively carried out at a nominal or specified ion energy, although in alternate embodiments step 104 may be carried out at (and for) multiple different ion energies. It will be understood that, with respect to step 104, the ion trajectory refers to the trajectory of the ion trapped within the ELIT 14, i.e., the trajectory of the ion oscillating back and forth between the ion mirrors M1, M2, each time passing through the charge detection cylinder CD.

Figure 6:
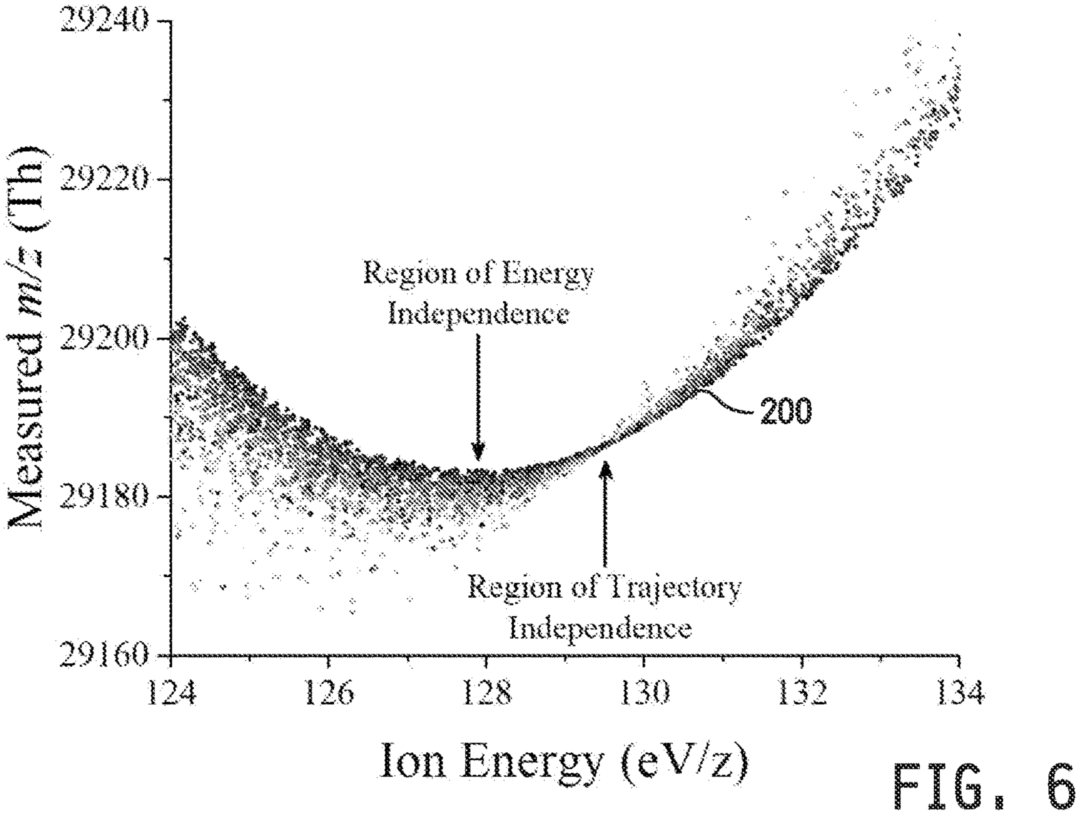
FIG. 6 is a plot of measured m/z vs. ion energy for the ELIT resulting from step 102 of the process illustrated in FIG. 5.

In one illustrative example of step 104, a home-built Fortran code was employed to simulate 5,000 trapping events, each containing a single ion, with a wide range of ion energies and a random distribution of entrance radial offsets and angular distributions representative of a realistic ion beam. Trajectory independence was achieved by identifying a particular beam energy at which the ion oscillation frequency in the trap, and thus the m/z measurement, is independent of the entering ion's radial offset and angular divergence. Referring to FIG. 6, for example, a plot 200 is shown of measured m/z (determined by relating the ion oscillation frequency to m/z by Equation 1 above) vs. ion energy for trajectories in the simplex optimized ELIT 14. Each point represents the m/z determined for a single trajectory. The spread in the plotted points represents angular divergence of the ions in the axial direction in the range of between 0 degrees and 1.2 degrees. The energies where the m/z is independent of ion trajectory and where m/z is independent of ion energy are both marked by arrows in FIG. 6. In this example, the ion trajectory-independent beam energy (as indicated by an arrow in FIG. 6) is at approximately 129.5 eV/z.

As described above, ions flying into an ion mirror M1, M2 become focused towards the longitudinal axis 20 by the electric field established inside the ion mirrors M1, M2 by the voltage sources V1, V2 (see FIGS. 2A and 2B). The oscillation frequency dependence on the ion trajectory is minimized when the location of the focal point along the axis 20 is resistant to change as a function of the trajectory. This illustratively occurs when the focal point is approximately half-way between the ion penetration depth IPD into the ion mirror M1, M2 and the center of the ELIT 14. Depending on the focal properties of the ion mirrors M1, M2, it is possible for this condition to be satisfied for more than one beam energy. Once the most trajectory-independent point was identified, the ion mirror voltages D1-D3 (D4 at ground potential) were scaled up by the factor needed to bring the beam energy of the trajectory independent point from around 129.5 eV/z back to its nominal or specified value of 130 eV/z.

From step 104, the process 100 advances to step 106 where the processor 52 is operable to determine geometric parameters at which the resulting mass-to-charge ratio (m/z) measurements made by the ELIT 14 are independent of ion energy. The processor 52 is illustratively operable at step 106 to modify at least one of the initial geometric parameters determined at step 102 to produce a resulting set of modified geometric parameters with which mass-to-charge (m/z) ratio measurements made by the ELIT 14 are independent of ion energy, i.e., independent of the energy of ions moving within the ELIT 14. Step 106 is illustratively carried out at the same nominal or specified ion energy as for step 104, although in alternate embodiments step 106 may be carried out at (and for) a different ion energy or at multiple different ion energies.

As described above, energy independence can be realized for an ideal ELIT when the penetration depth into an ion mirror M1, M2 is one quarter of the length, FFL, of the field free region (see FIG. 1). However, a realistic ELIT 14 with complex radial focusing fields in the ion mirrors M1, M2 along with a distribution of ion trajectories does not adhere to this ideal situation. It will be understood that, with respect to step 106, the ion energy refers to the energy of the ion trapped within the ELIT 14, i.e., the energy of the ion oscillating back and forth between the ion mirrors M1, M2, each time passing through the charge detection cylinder CD, which will typically be the same as the energy of the ion entering the ELIT 14.

Figure 7A:
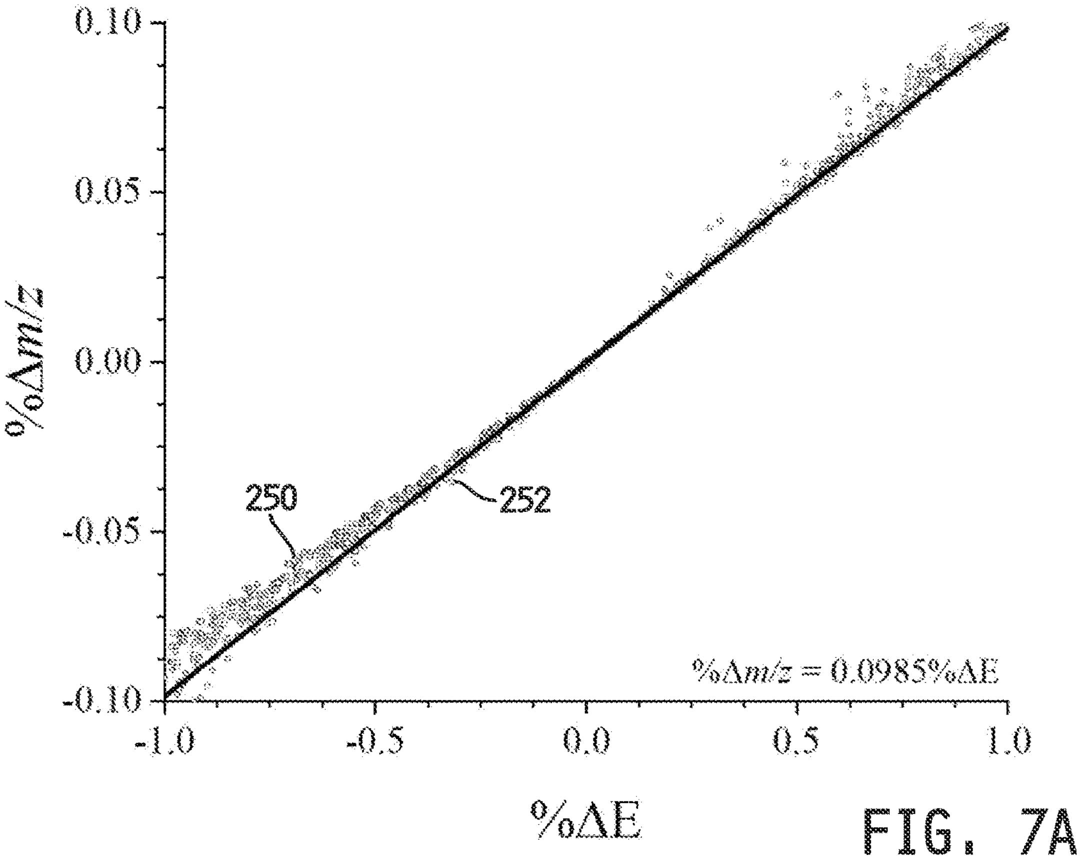
FIG. 7A is a plot of percent m/z deviation vs percent ion energy deviation for an ELIT with a 2.6 inch long field-free region.
Figure 7B:
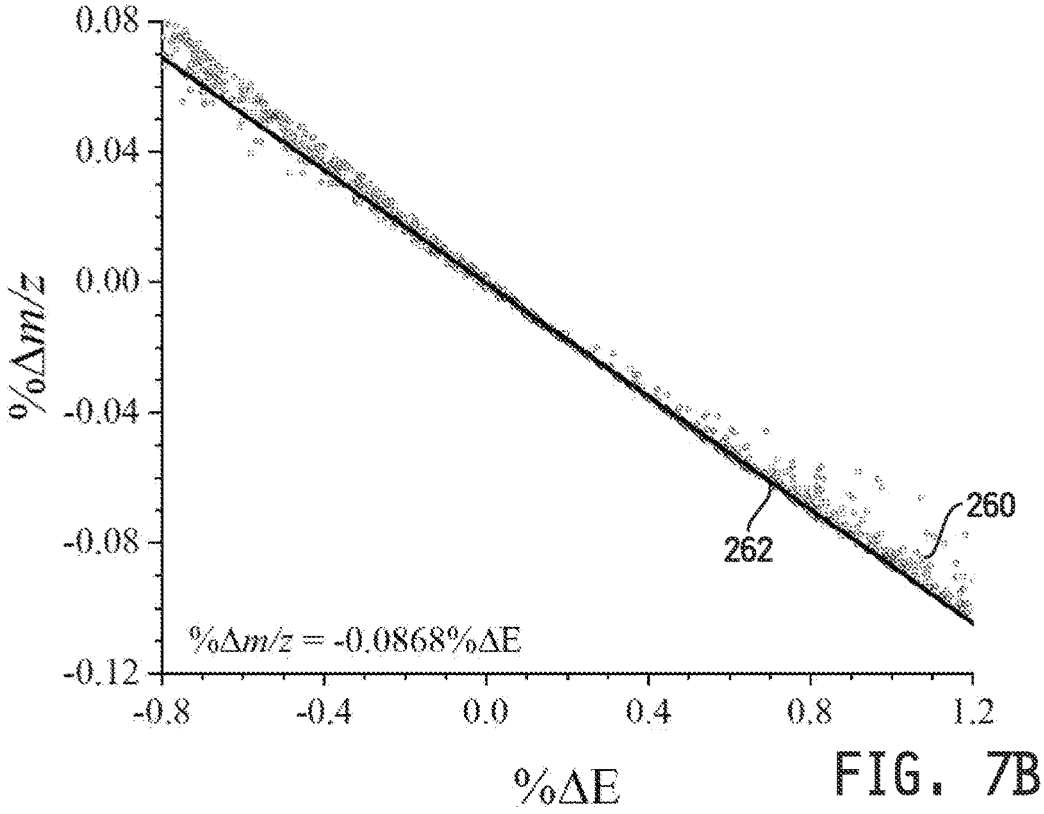
FIG. 7B is a plot of percent m/z deviation vs percent ion energy deviation for an ELIT with a 2.4 inch long field-free region.

As such, in one illustrative example of step 106, the energy-independent point was found numerically by varying the length FFL of the field-free region while keeping all other aspects of the ELIT 14 and ion conditions constant. With the ion mirror voltages D1-D3 scaled to bring the trajectory independent point back to a nominal or specified ion energy of 130 eV/z as described above, 5,000 single ion trapping events were simulated with a wide range of energies centered at 130 eV/z. Then for each trajectory, the percent change in the m/z value relative to the m/z at 130 eV/z (% Δm/z) was plotted against the percent change in the energy relative to the nominal value of 130 eV/z (% ΔE). The slope of the best linear fit through this plot was then used to quantify the dependence of the m/z measurement on the ion energy. Referring to FIGS. 7A and 7B, example plots 250 and 260 of percent change in m/z value relative to m/z at 130 eV/z are shown for field free region lengths, FFL, of 2.60 inches and 3.60 inches respectively. In FIG. 7A, the slope, % Δm/z, of the best fit line 252 through the plotted points 250 is % Δm/z=0.0985×% ΔE, and in FIG. 7B the slope, % Δm/z, of the best fit line 262 through the plotted points 260 is % Δm/z=−0.0868×% ΔE. The lines 252, 262 through the points 250, 260 respectively were illustratively fit to within +0.2% ΔE of the trajectory-independent point. Since the slope of the lines 252, 262 changed from positive to negative between FIGS. 7A and 7B, it follows that the slope will be zero for some value of the field free region length, FFL, between 2.600" and 3.600", and this optimum length will provide energy independence.

Figure 8:
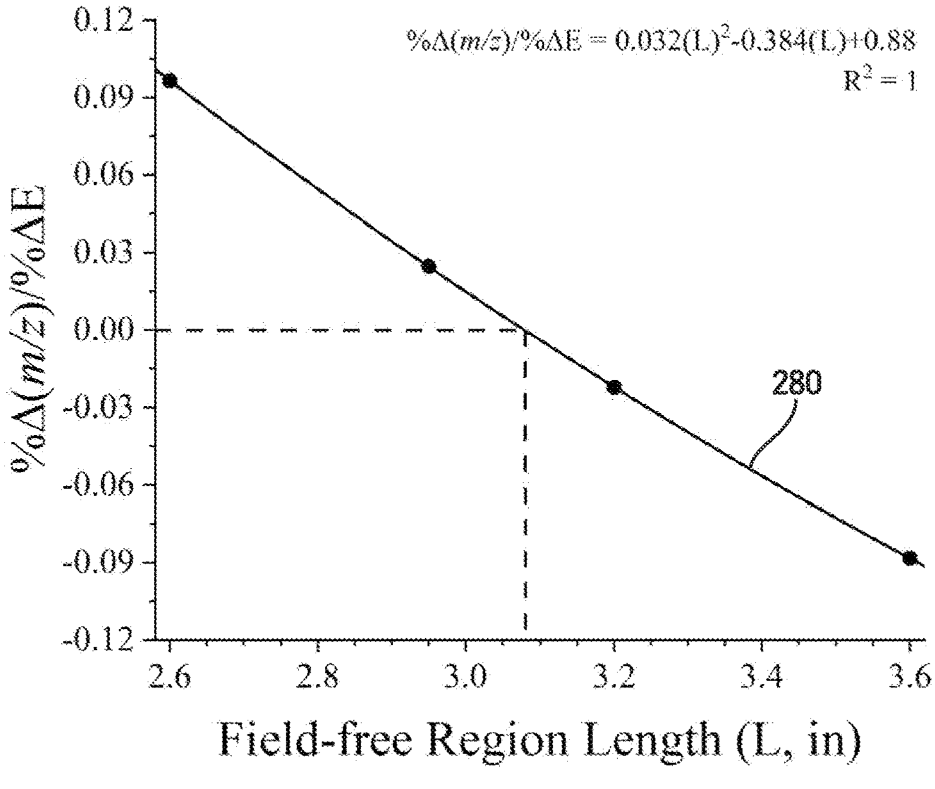
FIG. 8 is a plot of percent m/z deviation vs percent ion energy deviation for an ELIT with a different field-free region lengths to illustrate determination of an optimum field-free region length.
Figure 9:
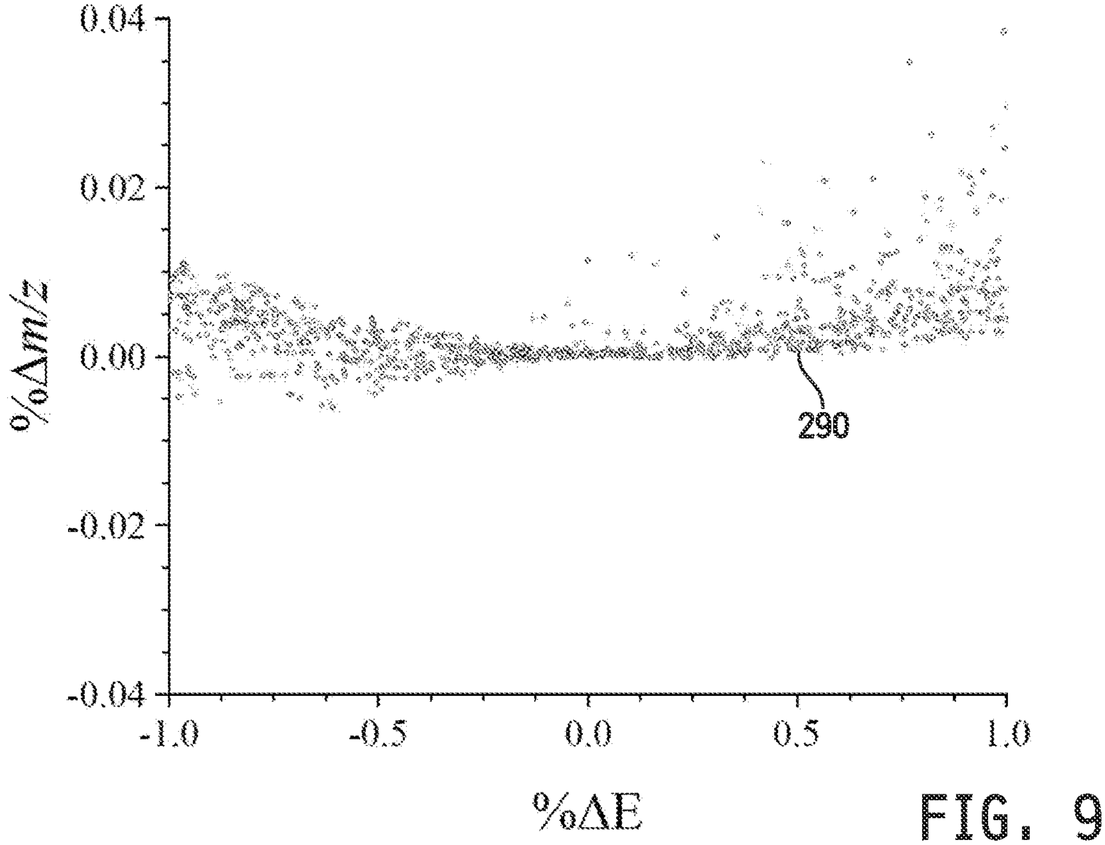
FIG. 9 is a plot of percent m/z deviation vs percent ion energy deviation for an ELIT with an optimum field-free region length as determined by the process illustrated in FIG. 5.

Trajectory simulations identical those described above and illustrated by example in FIGS. 7A and 7B were performed for two more field free region lengths between 2.600" and 3.600", and then the slopes (% Δm/z/% ΔE) 280 were plotted against the length, FFL, of the field free region, as illustrated by example in FIG. 8, to find the optimal length FFL where % Δm/z/% ΔE=0. This was illustratively accomplished by fitting a parabolic function to the data and, as illustrated in FIG. 8, the optimum energy independence, where % Δm/z/% ΔE=0, occurs at a field-free region length of 3.078 inches. FIG. 9 shows a plot 290 of % Δm/z values vs. % ΔE for 5000 trajectories calculated with the optimum field free region length, FFL, of 3.078 inches, illustrating the energy independence. With this FFL, the m/z measurement is almost entirely independent of the ion energy for ion energies close to the nominal value of 130 eV/z.

Figure 10:
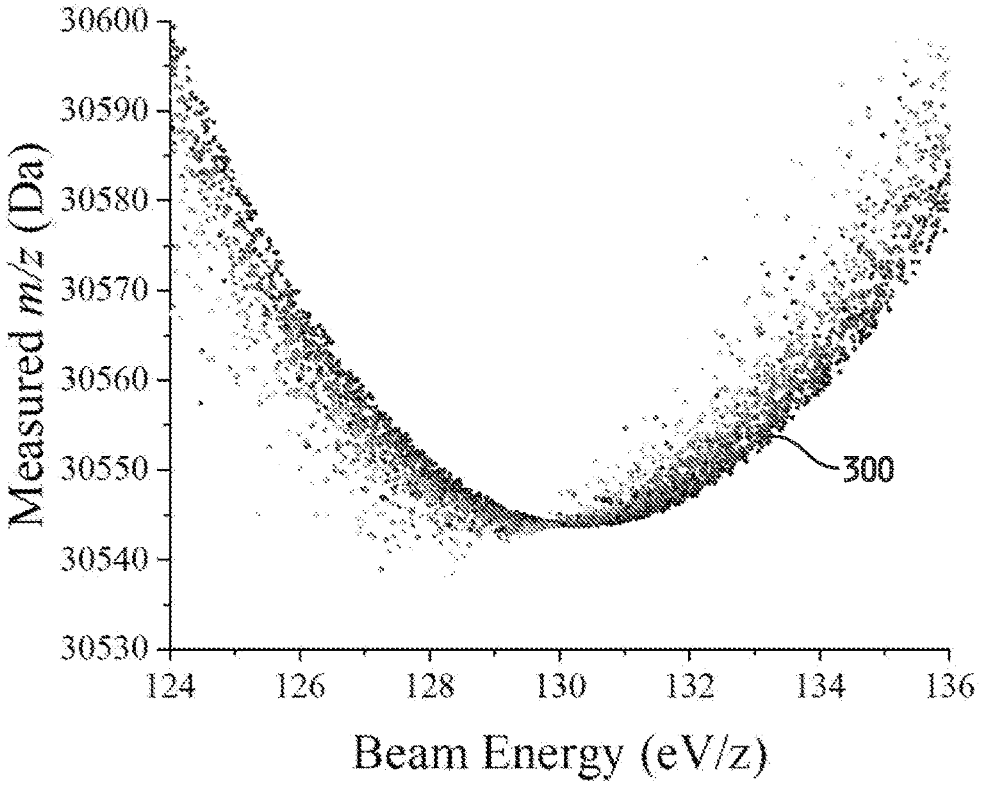
FIG. 10 is a plot of measured m/z vs. ion beam energy for an ELIT that has been fully optimized for m/z resolution according to the process illustrated in FIG. 5.

From step 106, the process 100 advances to step 108 where the processor 52 is operable to bring the electrostatic and geometric properties determined at steps 104 and 106 into coincidence with each other so as to minimize their effects on m/z measurements made by the ELIT 14. In some implementations, no further adjustments may be necessary, and step 108 may simply include running a final simulation to confirm that both the ion trajectory and energy dependencies have been simultaneously minimized. In the examples of steps 102-106 described above, the results of such a final simulation are shown in FIG. 10 where the plot 300 illustrates that optimum ion energies for energy independence and trajectory independence now coincide with one another at the nominal ion energy of 130 eV/z. As in the plot illustrated in FIG. 6, the spread in the plotted points in FIG. 10 represents angular divergence of the ions in the axial direction in the range of between 0 degrees and 1.2 degrees. In other implementations, step 108 may include re-executing steps 104 and 106 one or more times until such coincidence is achieved. Alternatively or additionally, step 108 may include execution of one or more conventional optimization algorithms operable to drive the ion energy independence and trajectory independence into coincidence.

Figure 11:
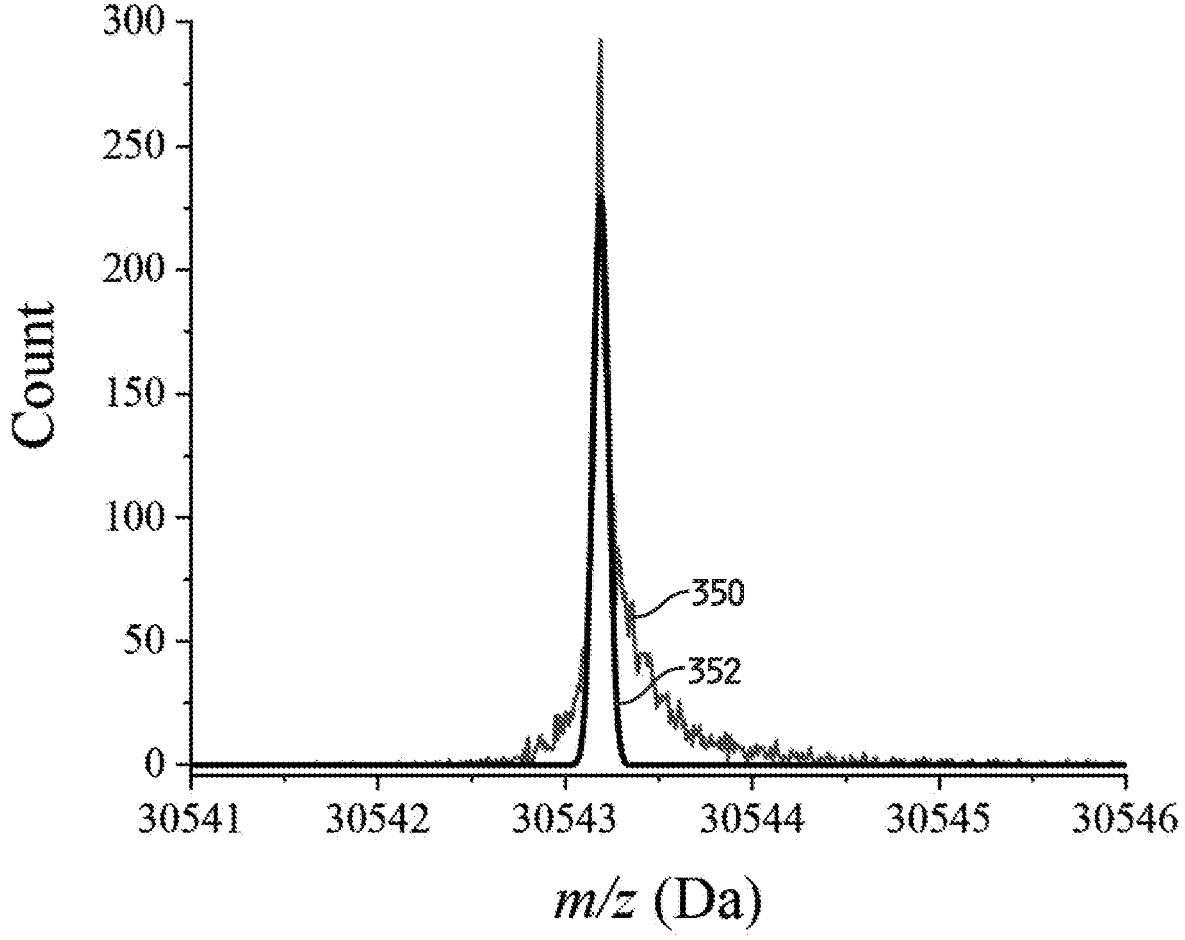
FIG. 11 is an example m/z spectrum determined with the ELIT fully optimized for m/z resolution.

With the ion energy and trajectory dependencies simultaneously minimized at step 108, the m/z resolving power in the examples of steps 102-108 increased to 307,000, and an example m/z distribution 350 determined for the fully optimized ELIT 14 is shown in FIG. 11. There is some low and high mass tailing that is attributable to aberrations in the endcap electric fields that give rise to imperfections in the endcap focal properties. These aberrations cause the m/z to slightly depend on the angular component of an ion's trajectory while it is oscillating inside the ELIT 14. Future improvements to the endcap electric field should reduce the tailing and bring more ions into the main m/z peak. Alternatively, the ion beam energy and endcap voltages can be proportionately increased to reduce the relative beam energy spread and reduce the effect that angular trajectories have on the m/z measurement precision. In any case, a Gaussian peak 352 is fit to the peak in the data 350 to illustrate an example m/z distribution which excludes such tails.

The optimized ELIT 14 has a trapping efficiency of approximately 95% (defined by the number of ions that can be trapped for 100 ms compared to the total number of ions flown into the trap with realistic entry conditions). It is likely that this number can be improved because the transmission mode focal voltages have not been adjusted to account for the geometric changes made to the trap during optimization; rather, only the reflection (or trapping) mode focal voltages have been adjusted using the process 100. Performing such additional optimization of the transmission mode focal voltages will bring more ions into the ELIT 14 with trajectories that fall within the trap stability region, thereby increasing above 95% the trapping efficiency of the ELIT 14.

In some embodiments, the process 100 may further include step 110, as illustrated in FIG. 5 by dashed-line representation. In embodiments which include step 110, the processor 52 is operable to adjust the axial length of the charge detection cylinder CD to the geometric adjustments made to the ELIT 14 at steps 106 and 108 so as to establish a 50% duty cycle of ion oscillations in the ELIT 14 in order to optimize charge measurements. Details relating to one example implementation of step 110 are provided in co-pending U.S. Pat. No. 11,232,941, the disclosure of which has been expressly incorporated herein by reference in its entirety. As detailed in the '626 publication, the length of the detection cylinder CD determines the duty cycle: the duty cycle is the amount of time an ion spends inside the detection cylinder CD divided by the time it takes for an ion to travel from one end of the ELIT 14 to the other. As further detailed in the '626 publication, the uncertainty in the charge measurement, i.e., the measurement of the charge of an ion trapped in the ELIT 14, is minimized for a 50% duty cycle. With a 50% duty cycle, the relative magnitude of the fundamental peak in FFT is maximized relative to the sum of the magnitudes of all harmonics, and changes in the magnitude of the fundamental peak due to variations in the ion energy and trajectory are thereby minimized. In an illustrative example of step 110 which continues from the examples given above with respect to steps 102-108, the detection cylinder length, CDL, was numerically optimized to find the length that gives the most stable energy-independent charge measurement. The induced charge signal from an ion trajectory was calculated by applying Green's reciprocity theorem to the trajectories and recording the ion signal at a 2.5 MHz sampling rate. Each ion was assigned a charge corresponding to 750 ADC bits. The signals were then analyzed by FFTs to determine the charge for each simulated ion. Simulations were performed for 5,000 single ion trapping events with realistic distributions of ion entrance energies and trajectories. The average charge and the charge RMSD were then determined and these quantities were plotted as a function of the detection cylinder length in FIGS. 12A and 12B. In addition to changing the cylinder length, its inner diameter was varied to characterize the effect that has on the charge measurement, and two example plots 400, 450 are shown in FIGS. 12A and 12B respectively for an inner diameter of 0.2 inches, and two example plots 402, 452 are shown in FIGS. 12A and 12B respectively for an inner diameter of 0.37 inches.

Figure 12A:
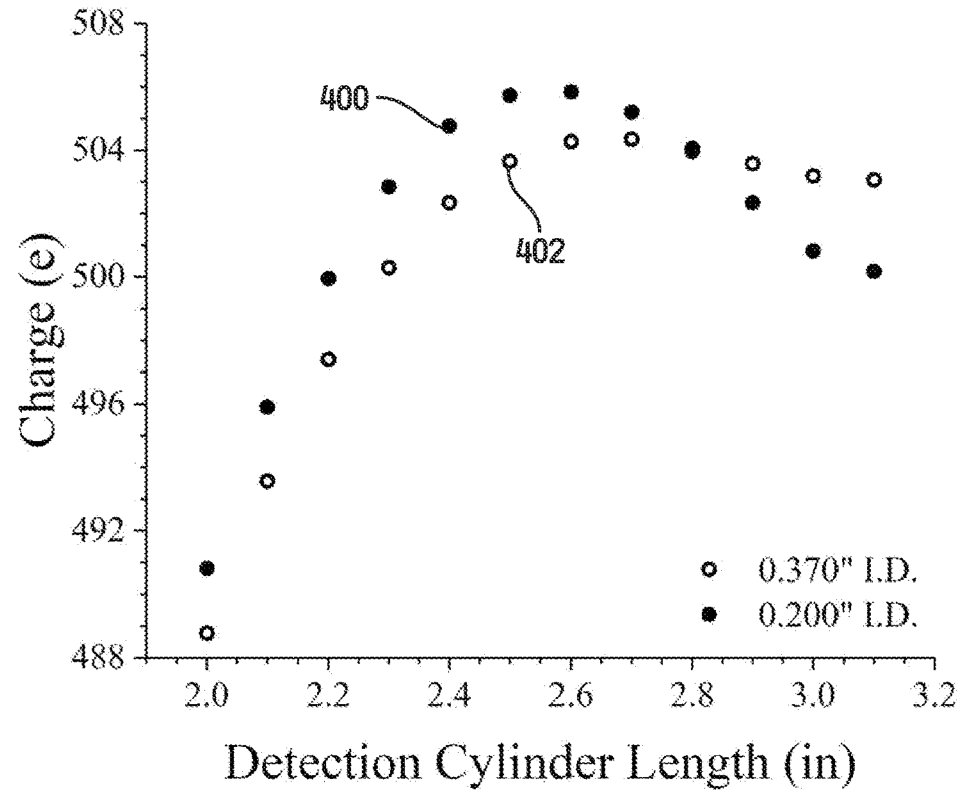
FIG. 12A is a plot of measured charge vs. detection cylinder length for the ELIT fully optimized for m/z resolution.
Figure 12B:
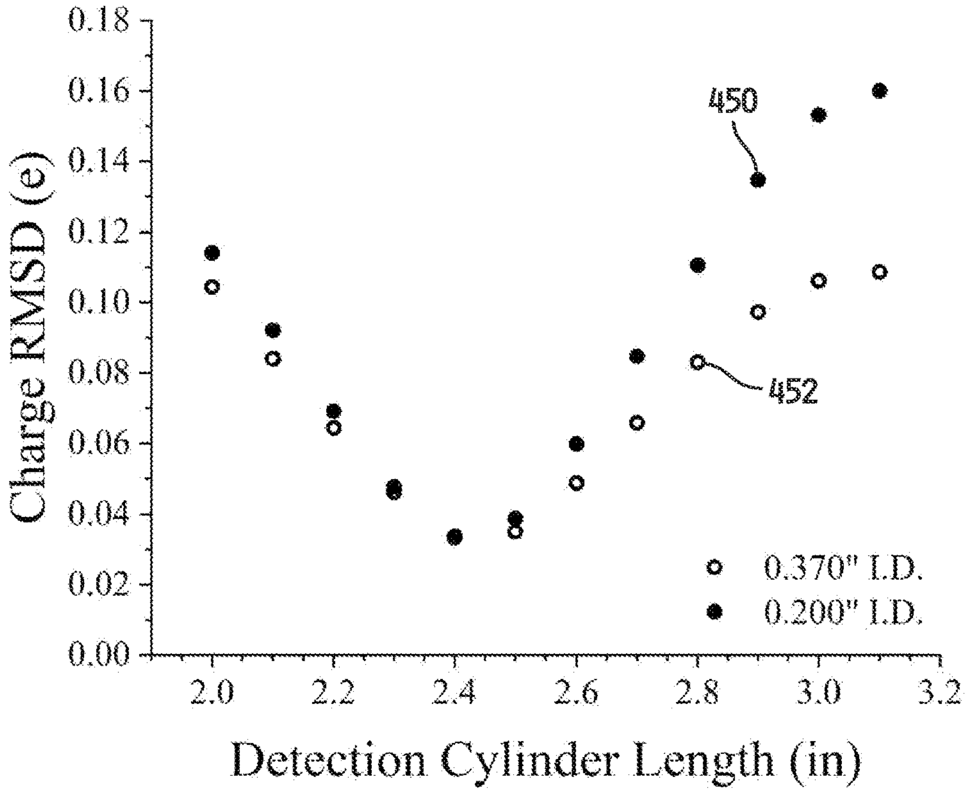
FIG. 12B is a plot of root mean square deviation (RMSD) vs. detection cylinder length for the ELIT fully optimized for m/s resolution.

According to FIG. 12A, a detection cylinder length, CDL, of around 2.6 inches has the highest signal-to-noise ratio (i.e., largest measured charge), and according to FIG. 12B, a detection cylinder length, CDL, of around 2.4 inches has the lowest charge RMSD. In the illustrated embodiment, it is more important that the charge RMSD be minimized, so the optimum detection cylinder length, CDL, is approximately 2.4 inches. In other embodiments, the highest signal-to-noise ratio may be deemed to be of higher importance relative to the RMSD, and in such embodiments the optimum CDL may be 2.6 inches. In still other embodiments, a CDL of between 2.4 inches and 2.6 inches may be preferred. In any case, the smaller 0.2 inches ID detection cylinder gives a higher signal strength because it has a faster signal onset than the wider inner diameter of 0.37 inches. This produces a better-defined square wave which, in turn, generates a more intense fundamental peak in the FFT. While the charge measurement still has a slight dependence on the angular divergence of an ion, this dependence can be ignored because the charge uncertainty is currently dominated by electrical noise.

Referring again to FIG. 5, the process 100 illustratively advances from step 110, in embodiments which include step 110, and otherwise advances from step 108 to step 112 where an actual, i.e., structural, ELIT 14 is constructed using the electrostatic and geometric parameters determined by the process 100. Such an ELIT 14 may then be implemented in a CDMS instrument, e.g., such as the instrument 10 illustrated in FIG. 1, to measure m/z and charge of charged particles generated from a sample.

In some embodiments, the ELIT 14 may be used in a conventional manner to trap and measure single ions, i.e., one ion at a time. Such operation is typical for measurements of high-mass ions, e.g., in the Kilodalton and Megadalton ranges. For lighter ions, the ELIT 14 may alternatively be used to trap and measure groups or packets of ions traveling together.

While this disclosure has been illustrated and described in detail in the foregoing drawings and description, the same is to be considered as illustrative and not restrictive in character, it being understood that only illustrative embodiments thereof have been shown and described and that all changes and modifications that come within the spirit of this disclosure are desired to be protected. For example, it will be understood that the ELIT 14 illustrated in the attached figures and described herein is provided only by way of example, and that the concepts, structures and techniques described above may be implemented directly in ELITs of various alternate designs. Any such alternate ELIT design may, for example, include any one or combination of two or more ELIT regions, more, fewer and/or differently-shaped ion mirror electrodes, more or fewer voltage sources, more or fewer DC or time-varying signals produced by one or more of the voltage sources, one or more ion mirrors defining additional electric field regions, or the like. As another example, although the process 100 illustrated in FIG. 5 is described above with the step 104 executed prior to step 106, it will be understood that in alternate embodiments step 106 may be executed prior to step 104. As yet another example, although steps 104 and step 106 of the process 100 illustrated in FIG. 5 are described above as being executed separately from one another, it will be understood that in alternate embodiments of the process 100 steps 104-108 may be combined into a single step in which a conventional optimization algorithm may be used to simultaneously determine the ion trajectory and energy independent operating conditions.

What is claimed is:

1. An electrostatic linear ion trap (ELIT), comprising:
first and second ion mirrors,
a charge detection cylinder positioned between and axially aligned with the first and second ion mirrors along a central, longitudinal axis,
at least one voltage source configured to supply voltages to each of the first and second ion mirrors to establish electric fields in each of the first and second ion mirrors to trap an ion in the ELIT with the ion oscillating back and forth between the first and second ion mirrors each time passing through the charge detection cylinder such that a mass-to-charge ratio (m/z) of the ion depends on a frequency of ion oscillation within the ELIT,
wherein at least one of the voltages is selected such that the m/z of the ion is independent of a trajectory of the ion entering into and moving within the ELIT relative to the longitudinal axis,
and wherein at least one geometric parameter of the ELIT is selected such that the m/z of the ion is independent of an energy of the ion entering into and moving within the ELIT.

2. The ELIT of claim 1, wherein the at least one of the voltages is further selected such that the m/z of the ion is independent of a trajectory of the ion entering into and moving within the ELIT with a specified ion energy.

3. The ELIT of claim 2, wherein the at least one of the voltages is selected by identifying an ion energy at which the ion oscillating back and forth between the two ion mirrors does so with an oscillation frequency that is independent of a radial offset and divergence of the ion entering the ELIT, and then scaling the at least one of the voltages to bring the identified ion energy to the specified ion energy.

4. The ELIT of claim 1, wherein the ELIT defines a field free region between opposed ends of the two ion mirrors,
and wherein the at least one geometric parameter of the ELIT includes a length of the field free region at which the m/z of the ion is independent of the energy of the ion.

5. The ELIT of claim 1, wherein an axial length of the detection cylinder is selected such that an amount of time an spent by the ion inside the detection cylinder is equal to ½ the time it takes for the ion to travel from one of the first and second ion mirrors to the other of the first and second ion mirrors.

6. A charge detection mass spectrometer, comprising:
an ion source configured to generate ions from a sample, the ELIT of claim 1 configured to receive at least one of the generated ions, and means for measuring the m/z of the received at least of the ions.

7. An electrostatic linear ion trap (ELIT), comprising:

first and second ion mirrors, an electric field free region including a charge detection cylinder positioned between the first and second ion mirrors, the first and second ion mirrors, the field free region and the charge detection cylinder axially aligned with one another along a central, longitudinal axis, the first and second ion mirrors each including a plurality of axially spaced apart electrodes, and at least one voltage source configured to supply voltages to each of the plurality of electrodes of the first and second ion mirrors to establish electric fields in each of the first and second ion mirrors to trap an ion in the ELIT such that the ion oscillates back and forth between the first and second ion mirrors each time passing through the charge detection cylinder and such that a mass-to-charge ratio (m/z) of the ion depends on a frequency of oscillation of the ion within the ELIT, wherein the voltages supplied to the plurality of electrodes of the first and second ion mirrors are selected such that the m/z of the ion is independent of a trajectory of the ion entering into and oscillating within the ELIT, and wherein a length of the electric field free region is selected such that the m/z of the ion is independent of an energy of the ion entering into and moving within the ELIT.

8. The ELIT of claim 7, wherein the voltages are further selected such that the m/z of the ion is independent of a trajectory of the ion entering into and moving within the ELIT with a specified ion energy.

9. The ELIT of claim 8, wherein the voltages are selected by identifying an ion energy at which the ion oscillating back and forth between the two ion mirrors does so with an oscillation frequency that is independent of a radial offset and divergence of the ion entering the ELIT, and then scaling the voltages to bring the identified ion energy to the specified ion energy.

10. The ELIT of claim 7, wherein an axial length of the detection cylinder is selected such that an amount of time an spent by the ion inside the detection cylinder is equal to ½ the time it takes for the ion to travel from one of the first and second ion mirrors to the other of the first and second ion mirrors.

11. A charge detection mass spectrometer, comprising:

an ion source configured to generate ions from a sample, the ELIT of claim 7 configured to receive at least one of the generated ions, and means for measuring the m/z of the received at least of the ions.

* * * * *